(12) United States Patent
Ho et al.

(10) Patent No.: US 10,993,078 B2
(45) Date of Patent: Apr. 27, 2021

(54) TRACKING SYSTEM FOR TRACKING AND RENDERING VIRTUAL OBJECT CORRESPONDING TO PHYSICAL OBJECT AND THE OPERATING METHOD FOR THE SAME

(71) Applicant: HTC Corporation, Taoyuan (TW)

(72) Inventors: Chien-Ting Ho, Taoyuan (TW);
Yen-Liang Kuo, Taoyuan (TW);
Chieh-Sen Lee, Taoyuan (TW);
Ta-Chun Pu, Taoyuan (TW)

(73) Assignee: HTC Corporation, Taoyuan (TW)

( * ) Notice: Subject to any disclaimer, the term of this patent is extended or adjusted under 35 U.S.C. 154(b) by 13 days.

(21) Appl. No.: 16/383,687

(22) Filed: Apr. 15, 2019

(65) Prior Publication Data

US 2019/0320293 A1 Oct. 17, 2019

Related U.S. Application Data

(60) Provisional application No. 62/657,936, filed on Apr. 16, 2018.

(51) Int. Cl.
*H04W 4/02* (2018.01)
*H04W 4/029* (2018.01)
(Continued)

(52) U.S. Cl.
CPC ...... *H04W 4/029* (2018.02); *G06K 19/07762* (2013.01); *G06T 19/20* (2013.01); *H04W 4/027* (2013.01)

(58) Field of Classification Search
None
See application file for complete search history.

(56) References Cited

U.S. PATENT DOCUMENTS

2007/0268178 A1 11/2007 Jung et al.
2011/0007650 A1* 1/2011 Nam .................. G01S 5/14
370/252
(Continued)

FOREIGN PATENT DOCUMENTS

CN 105705210 6/2016
CN 107250891 10/2017
(Continued)

OTHER PUBLICATIONS

"Search Report of Europe Counterpart Application", dated Jul. 12, 2019, pp. 1-13.
(Continued)

*Primary Examiner* — Brian M Butcher
(74) *Attorney, Agent, or Firm* — JCIPRNET

(57) ABSTRACT

A tracking system and a computer-implement operating method for the same are provided. The method includes transmitting a plurality of request wireless signals; in response to receiving the request wireless signals by the tag device, transmitting a plurality corresponding response wireless signals by the tag device; in response to receiving the corresponding response wireless signals by the anchor array, calculating a plurality of distances between the tag device and each of a plurality of anchor devices of the anchor array according to the request wireless signals and the response wireless signals, and accordingly calculating an absolute coordinate of the tag device; and in response to the absolute coordinate of the tag device is identified as being in a seen space of the virtual space by the processor, rendering a virtual object corresponding to the physical object into the seen space according to the absolute coordinate of the tag device.

24 Claims, 20 Drawing Sheets

(51) Int. Cl.
G06K 19/077 (2006.01)
G06T 19/20 (2011.01)

(56) References Cited

U.S. PATENT DOCUMENTS

| | | |
|---|---|---|
| 2011/0064033 A1 | 3/2011 | Gong et al. |
| 2016/0248995 A1 | 8/2016 | Mullins et al. |
| 2016/0316336 A1 | 10/2016 | Krenz et al. |
| 2017/0361726 A1* | 12/2017 | Widmer .................. G01D 5/20 |
| 2019/0094955 A1* | 3/2019 | Zuber .................... G01S 15/86 |

FOREIGN PATENT DOCUMENTS

| | | |
|---|---|---|
| EP | 3264132 | 1/2018 |
| TW | 201432495 | 8/2014 |
| TW | M555001 | 2/2018 |
| WO | 2019067650 | 4/2019 |

OTHER PUBLICATIONS

"Office Action of Taiwan Counterpart Application", dated Jul. 27, 2020, p. 1-p. 15.

* cited by examiner

TRACKING SYSTEM FOR TRACKING AND RENDERING VIRTUAL OBJECT CORRESPONDING TO PHYSICAL OBJECT AND THE OPERATING METHOD FOR THE SAME

CROSS-REFERENCE TO RELATED APPLICATION

This application claims the priority benefit of U.S. provisional application Ser. No. 62/657,936, filed on Apr. 16, 2018. The entirety of the above-mentioned patent application is hereby incorporated by reference herein and made a part of this specification.

BACKGROUND OF THE INVENTION

1. Field of the Invention

The disclosure relates to a tracking system, and more particularly to a tracking system comprising a wearable electronic device and one or more tag devices disposed in a physical object, and an operating method for the same.

2. Description of Related Art

Virtual reality (VR), Augmented reality (AR) or Mixed reality (MR) may provide a brand-new experience for the users by letting the user to "live" in a totally virtual world or to perform an interaction with a virtual content rendered in a seen space which mixed with the real-world scene and the virtual content by the computer of the related VR, AR or MR system. Furthermore, the user may use one or more a holding physical object (e.g., accessories or controllers) for performing the interaction with a virtual content generated by the related VR, AR or MR system by controlling and/or moving the physical object, and the VR, AR or MR system may track the position of the physical object and accordingly render the corresponding virtual object into the seen space.

SUMMARY OF THE INVENTION

A tracking system and a computer-implement operating method provided by the presented invention are capable of transmitting a plurality of request wireless signals and receiving a plurality of corresponding response signals transmitted by one or more tag devices disposed in a physical object, analyzing a time difference of those wireless signals to obtain the absolute coordinate of each of the one or more tag devices in the virtual space, so as to accordingly render a virtual object corresponding to the physical object into the virtual space according to the absolute coordinates of the one or more tag devices.

According to a concept of the present invention, a tracking system is provided. A tracking system includes a wearable electronic device and a tag device. The wearable electronic device includes an anchor array, a processor and a display device. A tag device is disposed in a physical object. The anchor array is configured to transmit a plurality of request wireless signals to the tag device, wherein each of the request wireless signals includes a transmitting time of that said each of the request wireless signals. In response to receiving the request wireless signals by the tag device, the tag device is configured to transmit a plurality corresponding response wireless signals to the anchor array. In response to receiving the corresponding response wireless signals by the anchor array, the processor is configured to calculate a plurality of distances between the tag device and each of a plurality of anchor devices of the anchor array according to the request wireless signals and the response wireless signals. Furthermore, the processor is configured to calculate a relative coordinate of the tag device according to the distances and calculate an absolute coordinate of the tag device according to the relative coordinate and a reference coordinate of a reference point of the wearable electronic device, wherein the reference coordinate is an absolute coordinate of the reference point in a virtual space corresponding to the wearable electronic device. Moreover, in response to the absolute coordinate of the tag device is identified as being in a seen space of the virtual space by the processor, the processor is configured to instruct the display device to render a virtual object corresponding to the physical object into the seen space according to the absolute coordinate of the tag device.

According to yet another concept of the present invention, a computer-implement operating method adapted to a tracking system is provided, wherein the tracking system comprises a wearable electronic device and a tag device disposed in a physical object. The method includes transmitting, by an anchor array of the wearable electronic device, a plurality of request wireless signals, wherein each of the request wireless signals includes a transmitting time of that said each of the request wireless signals; in response to receiving the request wireless signals by the tag device, transmitting a plurality corresponding response wireless signals by the tag device; in response to receiving the corresponding response wireless signals by the anchor array, calculating a plurality of distances between the tag device and each of a plurality of anchor devices of the anchor array according to the request wireless signals and the response wireless signals by a processor of the wearable electronic device; calculating, by the processor, a relative coordinate of the tag device according to the distances; calculating, by the processor, an absolute coordinate of the tag device according to the relative coordinate and a reference coordinate of a reference point of the wearable electronic device, wherein the reference coordinate is an absolute coordinate of the reference point in a virtual space corresponding to the wearable electronic device; and in response to the absolute coordinate of the tag device is identified as being in a seen space of the virtual space by the processor, rendering a virtual object corresponding to the physical object into the seen space according to the absolute coordinate of the tag device by a display device of the wearable electronic device.

According to a further concept of the present invention, a tracking system is provided. A tracking system includes a wearable electronic device and a tag device. The wearable electronic device includes an anchor array, a processor and a display device. The tag devices are disposed in a physical object. The anchor array is configured to transmit a plurality of request wireless signals, wherein each of the request wireless signals includes a transmitting time of that said each of the request wireless signals. In response to receiving the request wireless signals by the tag devices, the tag devices are configured to transmit a plurality corresponding response wireless signals to the anchor array. In response to receiving the corresponding response wireless signals by the anchor array, the processor is configured to calculate a plurality of distances between each of the tag devices and each of a plurality of anchor devices of the anchor array according to the request wireless signals and the response wireless signals. Furthermore, the processor is configured to calculate a relative coordinate of each of the tag devices according to the distances and calculate an absolute coordinate of each of the tag devices according to the relative coordinate of each of the tag devices and a reference coordinate of a reference point of the wearable electronic device, wherein the reference coordinate is an absolute coordinate of the reference point in a virtual space corresponding to the wearable electronic device. Moreover, in response to a first absolute coordinate of a first tag device among the tag devices is identified as being in a seen space of a virtual space by the processor, the processor is configured to instruct the display device to render a first part of a virtual object corresponding to the physical object into the seen space according to the first absolute coordinate.

According to a further concept of the present invention, a tracking system is provided. A tracking system includes a wearable electronic device and a tag device. The wearable electronic device includes an anchor array, a processor and a display device. The tag devices are disposed in a physical object. The tag device is configured to broadcast a wireless signal, wherein the wireless signal includes a transmitting time of the wireless signal. In response to receiving the wireless signal by the anchor array, the processor is configured to calculate a plurality of distances between the tag device and a plurality of anchor devices of the anchor array according to the wireless signal. Furthermore, the processor is configured to calculate a relative coordinate of the tag device according to the distances and calculate an absolute coordinate of the tag device according to the relative coordinate of the tag device and a reference coordinate of a reference point of the wearable electronic device. In response to the absolute coordinate of the tag device is identified as being in a seen space of a virtual space by the processor, the processor is configured to instruct the display device to render a virtual object corresponding to the physical object into the seen space according to the absolute coordinate of the tag device.

Based on the foregoing embodiment, the provided tracking system and computer-implement operating method for the same are capable of transmitting the request wireless signals and receiving corresponding response signals transmitted by one or more tag devices disposed in a physical object, analyzing a time difference of those wireless signals to obtain the absolute coordinate of each of the one or more tag devices in the virtual space, and accordingly render a virtual object corresponding to the physical object into the virtual space according to the absolute coordinates of the one or more tag devices, such that the position and the motion of the physical object for controlling the corresponding virtual object can be determined accurately and efficiently without performing a image recognition, or a laser position operation on the physical object. Therefore, the function of the tracking system would be improved and the cost of the tracking system can be decreased.

BRIEF DESCRIPTION OF THE DRAWINGS

The accompanying drawings are included to provide a further understanding of the present invention, and are incorporated in and constitute a part of this specification. The drawings illustrate embodiments of the present invention and, together with the description, serve to explain the principles of the present invention.

DESCRIPTION OF THE EMBODIMENTS

Figure 1A:
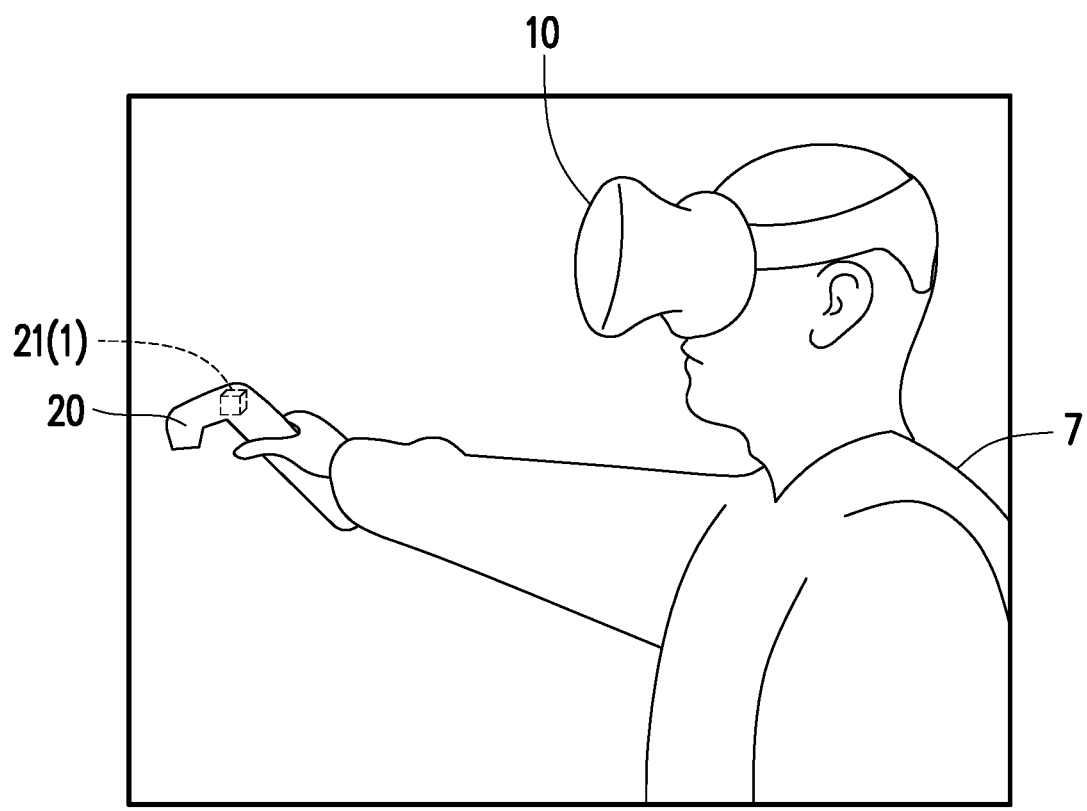
FIG. 1A shows a using schematic diagram of a tracking system according to an embodiment of the present invention.

Reference will now be made in detail to the present preferred embodiments of the present invention, examples of which are illustrated in the accompanying drawings. Wherever possible, the same reference numbers are used in the drawings and the description to refer to the same or like parts.

Figure 2A:
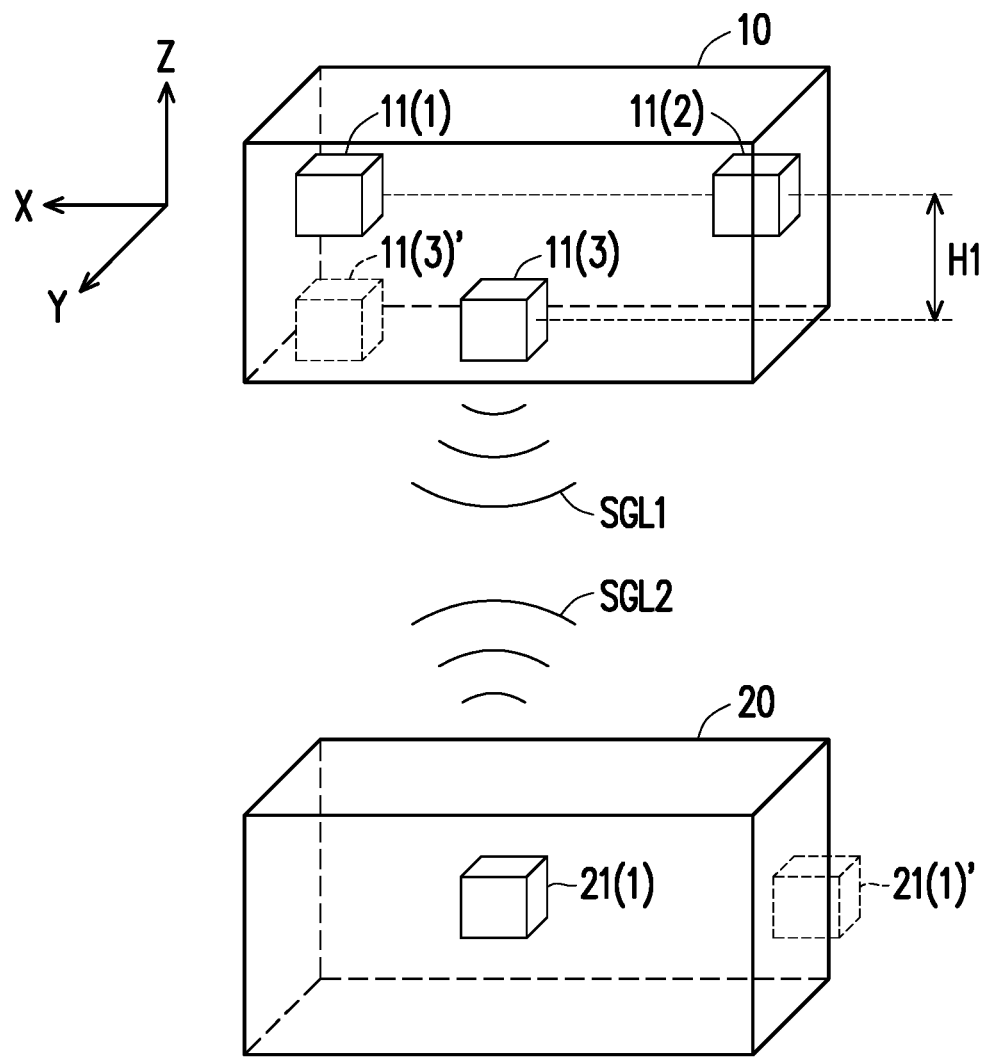
FIG. 2A shows a schematic diagram of a tracking system according to the first embodiment of the present invention.

Referring to FIGS. 1A and 2A, in the embodiment, the proposed invention is a tracking system that incorporates a wearable electronic device 10 and a tag device 21(1) disposed in a physical object (e.g., a controller of the wearable electronic device). The wearable electronic device 10 is worn in a similar manner as eyeglasses, a helmet, a VR HMD (Head-Mounted Display), AR HMD, MR HMD, etc. The wearable electronic device 10 may cooperate with the tag device 21(1) to determine the position of the tag device/ physical object, so as to perform a related control operation (e.g., moving a virtual object corresponding to the physical object) or display operations (e.g., rendering the virtual object in the virtual space displayed by the wearable electronic device 10).

For example. assuming a user 7 wears a wearable electronic device 10 of a tracking system 1, and the direction from the back side to the front side of the wearer/wearable electronic device corresponds a Y coordinate axis (also referred to as Y direction) of the orthogonal coordinate system, the direction from the left side to the right side of the wearer/wearable electronic device corresponds a X coordinate axis (also referred to as X direction), and the direction from the bottom side to the top side of the wearer/wearable electronic device corresponds a Z coordinate axis (also referred to as Z direction) of the orthogonal coordinate system. The origin of the orthogonal coordinate system is referred to as the reference point of the wearable electronic device, and the reference point may present as a predetermined point or a predetermined physical element in the wearable electronic device. In an embodiment, the reference point is one (also referred to as the reference anchor device) of the anchor device 11(1) to 11(3). It should be noted that, in the foregoing embodiment, the wearable electronic device is a VR HMD device, and the physical object is the controller of the VR HMD device. However, the present invention is not limited thereto.

Figure 1B:
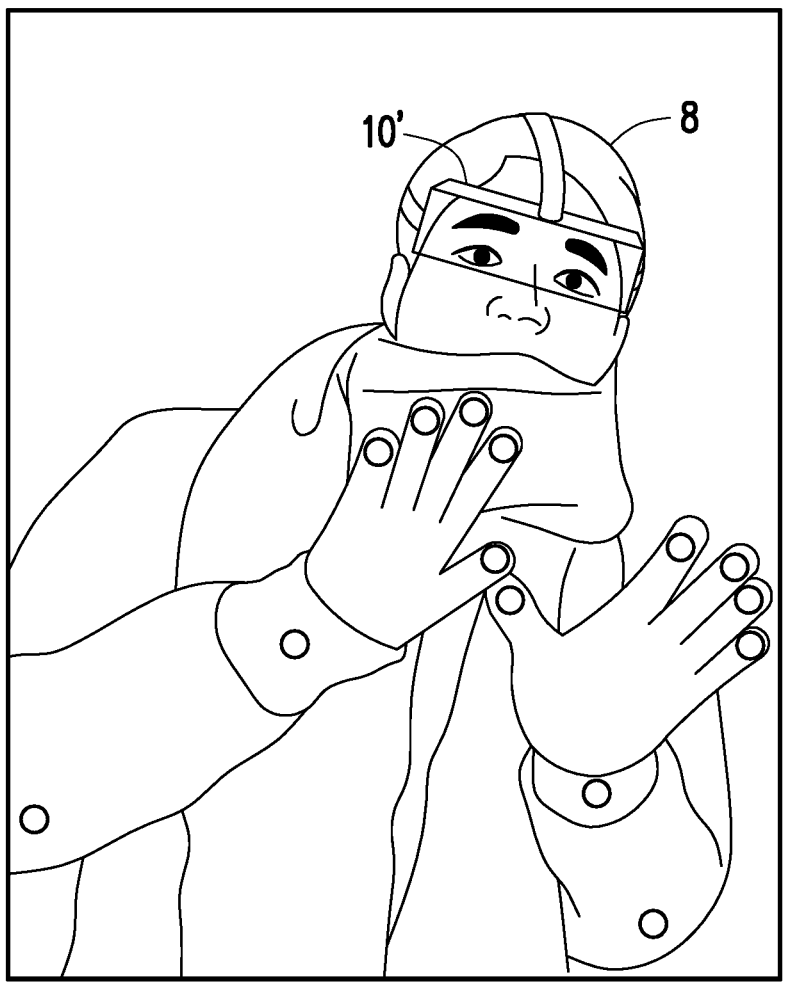
FIG. 1B shows a using schematic diagram of another tracking system according to another embodiment of the present invention.

For example, referring to FIG. 1B, in another embodiment, a user 8 wears a AR HMD device (or a MR HMD device) as the wearable electronic device 10', and a plurality of tag devices are disposed on a pair of gloves (physical objects) and the jacket (a physical object) of the user 8. The wearable electronic device 10' may cooperate with anchor devices to determine the position (and the motion) of the tag devices, and the wearable electronic. The pair of virtual gloves may be rendered on the lens of wearable electronic device 10' by the display device of the wearable electronic device 10'. Then, user may move the rendered virtual gloves to interact with other virtual content by moving the (physical) gloves, wherein the position and the motion of the virtual gloves would be determined via the cooperation of wearable electronic device 10' and the tag devices on the glove.

First Embodiment

Referring to FIG. 2A, in the first embodiment, the tracking system 1 includes a wearable electronic device 10 and a tag device 21(1). The tag device 21(1) may be disposed inside a physical object 20, but the present invention is not limited thereto. For example, in another embodiment, a tag device 21(1)' is disposed on a surface of the physical object 20. The wearable electronic device 10 communicates with the tag device 21(1) via the wireless signals SGL1 and the wireless signal SGL2. The wireless signal SGL2 is transmitted by the tag device 21(1). Each of the wireless signals SGL1 is transmitted by an anchor device of an anchor array.

Figure 2B:
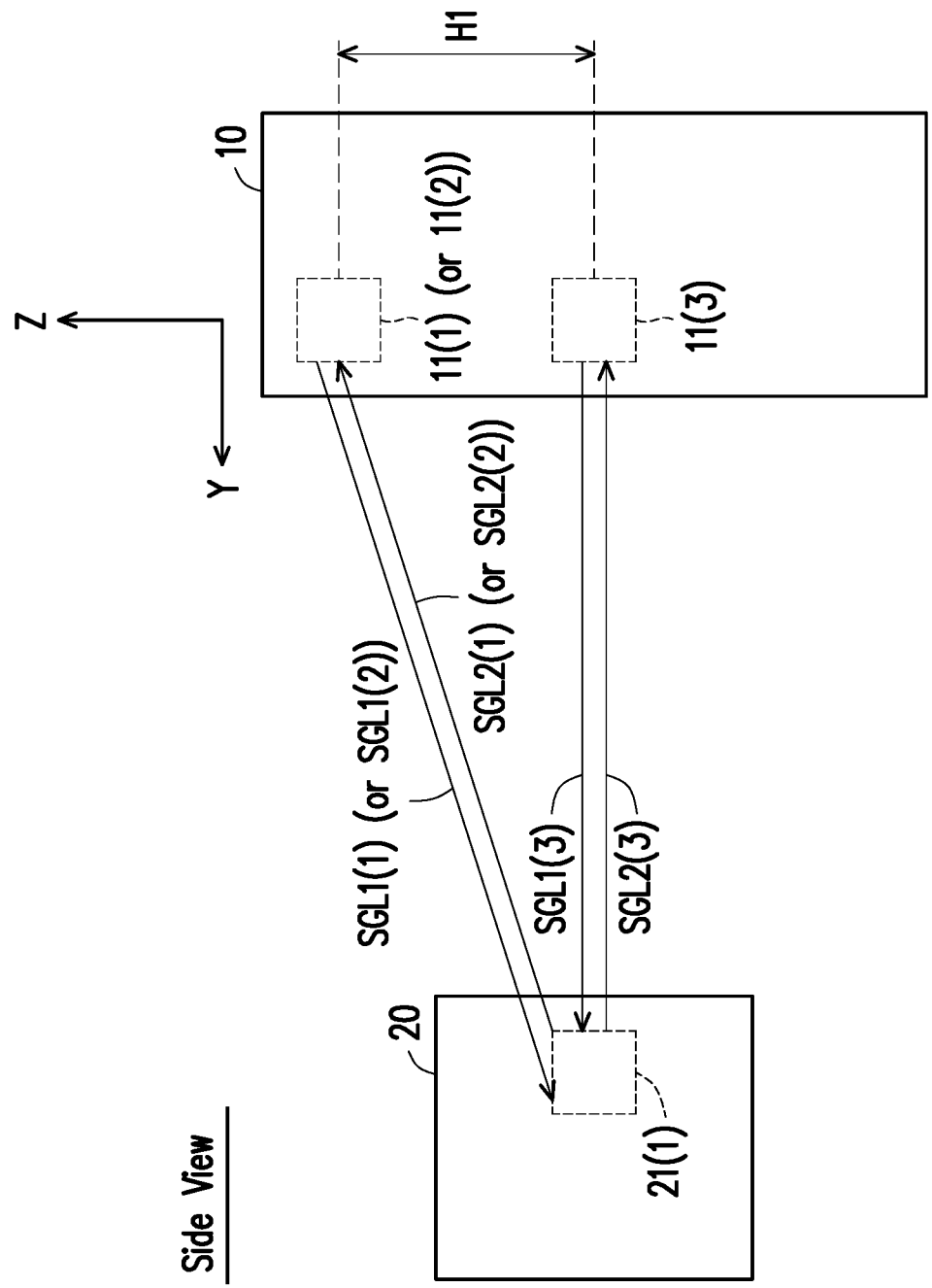
FIG. 2B shows a side view of a tracking system according to the first embodiment of the present invention.
Figure 2C:
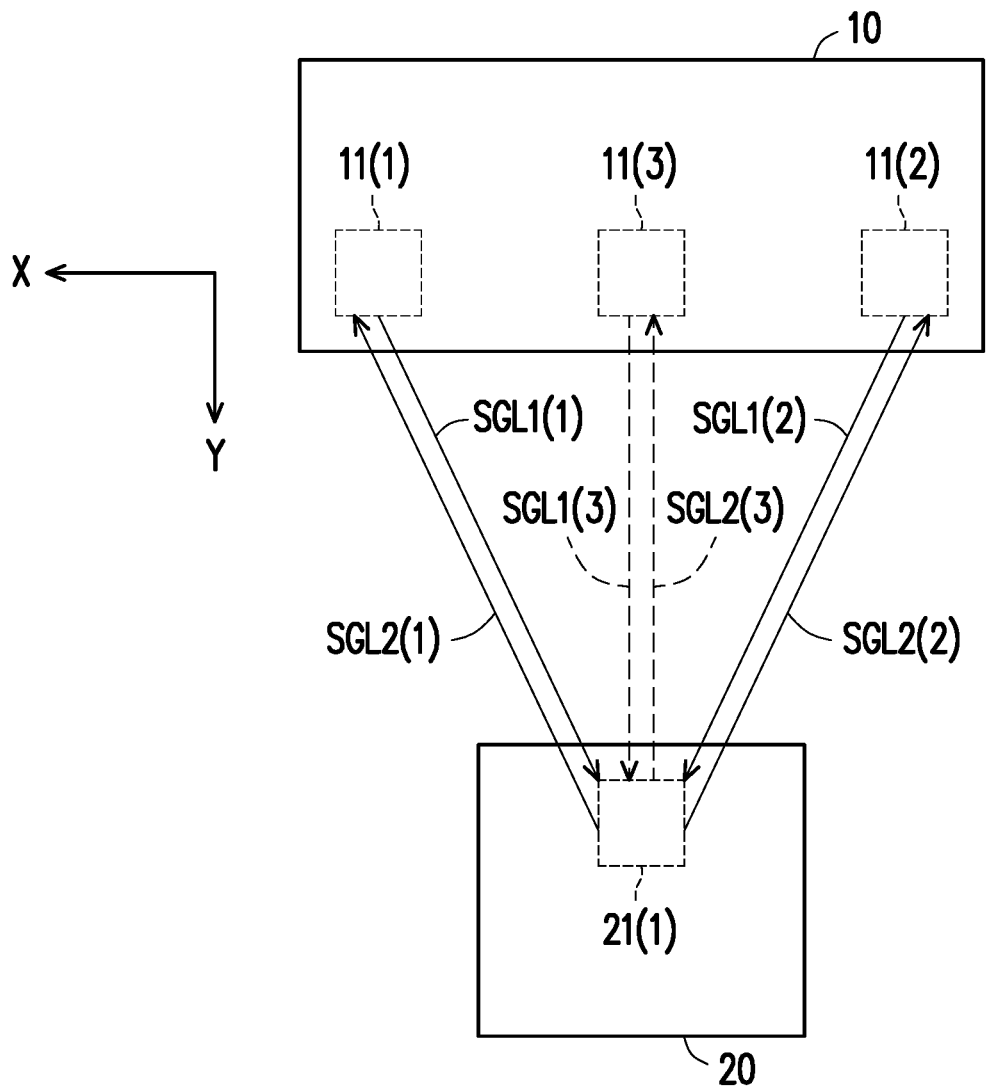
FIG. 2C shows an aerial view of a tracking system according to the first embodiment of the present invention.

More specifically, in the first embodiment, the anchor array of the wearable electronic device 10 includes a plurality of anchor devices 11(1) to 11(3) disposed in the same one X-Z plane. The anchor devices 11(1) to 11(2) of the anchor array are disposed in the same one X-Y plane (e.g., first X-Y plane) of the orthogonal coordinate system. Furthermore, the anchor device 11(3) is disposed in another X-Y plane (e.g., second X-Y plane) of the orthogonal coordinate system, and there is a Z-direction distance H1 between the first X-Y plane and the second X-Y plane (as illustrated in FIG. 2A). In another embodiment, an anchor device 11(3)' belonging to the second X-Y plane may be disposed directly below the anchor device 11(1) (e.g., the reference anchor device). In other words, at least two of the anchor devices 11(1) to 11(3) are disposed with a Z-direction distance H1 therebetween (as illustrated in FIG. 2B), and at least two of the anchor devices 11(1) to 11(3) are disposed with a X-direction distance (or Y-direction distance) therebetween (as illustrated in FIG. 2C). It should be noted that the arrangement of the anchor devices is only utilized an illustrated, the exemplary embodiment is not intended to limit the number of the anchor devices. In some exemplary embodiments, one or more anchor devices may be added into the wearable electronic device 10 and all the anchor devices of the anchor array may be disposed in other kinds of relative position according to actual needs.

Figure 3A:
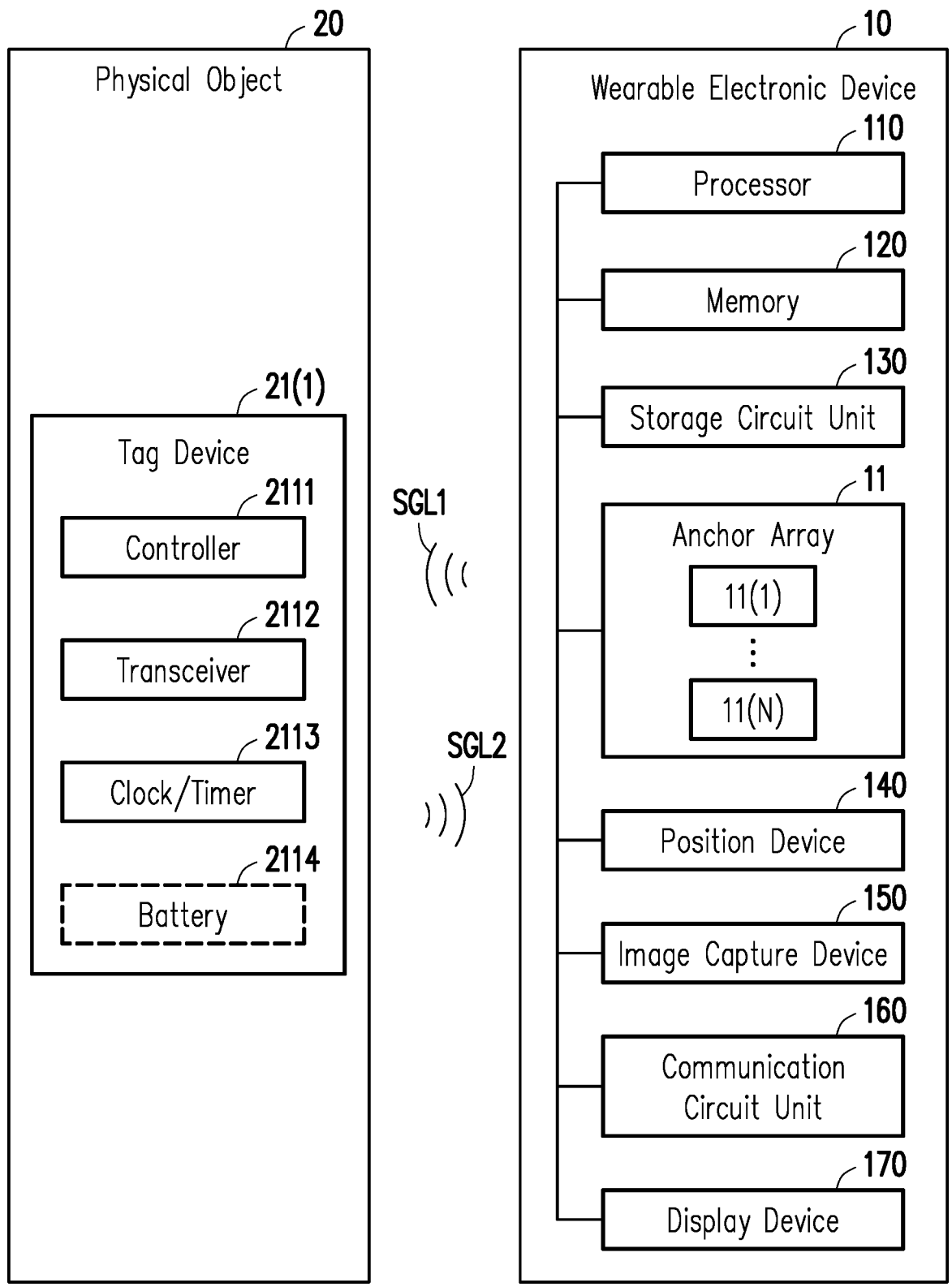
FIG. 3A shows a block diagram of a wearable electronic apparatus according to the first embodiment of the present invention.

Referring to FIG. 3A, in the first embodiment, the wearable electronic device 10 includes a processor 110, a memory 120, a storage circuit unit 130, an anchor array 11, a position device 140, an image capture device 150, a communication circuit unit 160 and a display device 170. The Anchor array 11 includes a plurality of anchor devices 11(1) to 11(N). N may be a positive integer equal to or larger than 3. The tag device 21(1) includes a controller 2111, a transceiver (wireless transceiver) 2112, a clock (or timer) 2113. In another embodiment, the tag device 21(1) further includes a battery 2114.

Figure 3B:
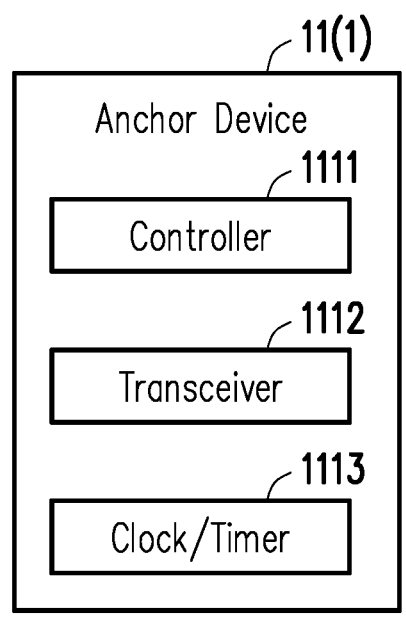
FIG. 3B shows a block diagram of an anchor device according to the first embodiment of the present invention.

Referring to FIG. 3B, in the first embodiment, each of the anchor devices, for example, the anchor device 11(1) includes a controller 1111, a transceiver 1112 and a clock (or a timer) 1113.

The transceiver (e.g., the transceiver 2112 or the transceiver 1112) in each of the anchor devices and the tag devices is, for example, a millimeter-level wireless signal transceiver which is configured to transmit or receive millimeter-level wireless signal. The frequency of the millimeter-level wireless signal is larger than 20 GHz. In an embodiment, the frequency of the millimeter-level wireless signal is higher than 20 GHz and smaller than 30 GHz. The controller (e.g., the controller 2111 or the controller 1111) in each of the anchor devices and the tag devices is configured to control/ management the whole operation of each of the anchor devices and the tag devices.

The clock/timer (e.g., the clock/timer 2113 or the clock/ timer 1113) in each of the anchor devices and the tag devices is configured to indicate current time of the tag device or the anchor device to which the clock/timer belongs. In a further embodiment, the clock/timer (e.g., the clock/timer 2113 or the clock/timer 1113) in each of the anchor devices and the tag devices is configured to recoding and accumulate a timestamp (also referred to as time information). The accuracy of the clock/timer 2113 and the clock/timer 1113 may be up to nanoseconds ($10^{-9}$ seconds). For example, the clock/timer 2113 and the clock/timer 1113 may be the high-speed counter which counting the timestamp by a frequency of 10 GHz.

In the first embodiment, the indicated current time may be set to a specified time by the corresponding controller, and the recorded (accumulated) timestamp may be reset to a default value or be set to a specified timestamp by the corresponding controller. Specifically, a time synchronization may be performed by the processor 110 (or the controller 1111 of the anchor device 11(1)) and the controller 2111 via a wireless connection established between the tag device 21(1) and the wearable electronic device 10 (or the anchor device 11(1)). After the time synchronization is finished, the indicated time (or the recorded timestamp) of the clock/timer 2113 of the tag device 21(1) and the indicated time (or the recorded timestamp) of the clock/timer 1113 of the anchor device 11(1) would be set to the same specified time. In an embodiment, the time synchronization may be performed before the anchor array 11 transmitting the wireless signals to the tag device 21(1).

In the first embodiment, the processor 110 may be, for example, a central processing unit (CPU) of the wearable electronic device 10 and, thus, control the overall operation of wearable electronic device 10. In certain embodiments, the processor 110 accomplishes this by loading software or firmware stored in a non-transitory computer readable recording medium (or storage circuit unit 130), and executing the software or firmware thereof (e.g., the processor 110 is programmed), so as to implement the operating method provided in the embodiment as well. The processor 110 may be, or may include, one or more programmable general-purpose or special-purpose microprocessors, digital signal processors (DSPs), programmable controllers, application specific integrated circuits (ASICs), programmable logic devices (PLDs), or the like, or a combination of such devices.

The memory 120 is configured to temporarily store data instructed by the processor 110. The memory may be, for example, a dynamic random access memory, a static random access memory or other suitable memory. The processor 110 may load program code modules into the memory 120 and execute the loaded program code modules to implement the operating method provided by the embodiments of the present invention.

The anchor array 11 (or the anchor device thereof) is configured to generate wireless signals (e.g., wireless signals SGL1), transmit the generated wireless signals, and receive one or more wireless signals (e.g., the wireless signals SGL2 transmitted by the tag device 21(1)).

Referring to FIG. 2B, Each of the wireless signals generated and transmitted by an anchor device (e.g., the anchor device 11(1)) of the anchor array 11 may include at least one of the following: a transmitting time, an anchor device identification (ID) and a tag device ID. For example, the transmitting time of the wireless signal SGL1(1) transmitted by the anchor device 11(1) is the time when the anchor device 11(1) is transmitting the wireless signal SGL1(1). The anchor ID of the wireless signal SGL1(1) may be used for identifying the transmitter of the wireless signal SGL1(1), the tag device ID may be used for identifying the target tag device (the receiver) of the wireless signal SGL1(1).

Furthermore, each of the wireless signals transmitted by a tag device (e.g., the tag device 21(1)) may include at least one of the following: a receiving time, an anchor device ID, a tag device ID and a tag transmitting time. For example, the tag transmitting time of the wireless signal SGL2(1) transmitted by the tag device 21(1) is the time when the tag device 21(1) is transmitting the wireless signal SGL2(1), the receiving time of the wireless signal SGL2(1) is the time when the tag device 21(1) is receiving the wireless signal SGL1(1), the anchor device ID of the wireless signal SGL2(1) may be used for identifying the corresponding target anchor device of the wireless signal SGL2(1), and the tag device ID of the wireless signal SGL2(1) may be used for identifying the transmitter of the wireless signal SGL2(1) (e.g., tag device 21(1)).

The position device 140 is configured to locate the position of the wearable electronic device. The position device 140 may include a Global Positioning System (GPS) circuit module, and the position may be a global coordinate of the wearable electronic device 10 obtained via the GPS system. The processor 110 may identify the real-world environment around the wearable electronic device 10 by mapping the global coordinate with predetermined map information. Furthermore, the processor 10 may construct the virtual space around the wearable electronic device 10 according to the identified real-world environment. In an embodiment, the processor 10 may construct the virtual space around the wearable electronic device 10 according to the absolute coordinate of the wearable electronic device 10 without identifying the real-world environment around the wearable electronic device 10, wherein the absolute coordinate of the wearable electronic device 10 may be continuously identified with the movement of the position of the wearable electronic device 10 from a preset starting the absolute coordinate. In an embodiment, the obtained global coordinate of the wearable electronic device 10 may be converted into the wearable electronic device 10's absolute coordinate in a virtual space (also called a virtual world) corresponding to the wearable electronic device 10.

Furthermore, in a further embodiment, the position device 140 may apply the Simultaneous Localization and Mapping (SLAM) algorithm to identify the real-world environment around the wearable electronic device 10, so as to generate the corresponding map information (e.g., map around the wearable electronic device 10), and to identify the position of the wearable electronic device 10 in the generated map. A series of related image identifications performed on the nearby images captured by the image capture device 150 and distance detections performed by light sensors (e.g., laser range finder) may be needed for implementing the SLAM algorithm.

The image capture device 150 includes one or more lenses disposed on the surface (e.g., the front surface) of the wearable electronic device 10 and including photosensitive elements for respectively sensing the intensity of light entering each of the lenses to generate an image. The photosensitive element is, for example, a Charge Coupled Device (CCD), a Complementary Metal-Oxide Semiconductor (CMOS) element, or other components, and the present invention is not limited thereto.

The communication circuit unit 160 is configured to transmit or receive data through wireless communication connecting to a local network, internet or other communication circuit unit of other electronic device (e.g., other wearable electronic device). The communication circuit unit 160 may be, for example, the circuit/chipset supporting one or a combination of the following protocols: a Global System for Mobile Communication (GSM) system, a Personal Handy-phone System (PHS), and a Code Division Multiple Access (CDMA) system. Wireless Fidelity (WiFi) system, Worldwide Interoperability for Microwave Access (WiMAX) system, Third-generation wireless communication technology (3G), Fourth-generation wireless communication technology (4G), Fifth-generation wireless communication technology (5G), Long Term Evolution (LTE), Bluetooth (BT) communication technology, and is not limited thereto.

In an embodiment, assuming that the wearable electronic device 10 is a VR HMD device (as illustrated in FIG. 1A), the display device 170 may include one or more screens disposed on a side which is facing to the user when the user (also called the wearer) wears the wearable electronic device 10. In this embodiment, the wearer may see the visual content (e.g., virtual objects or a part of the virtual world) rendered by the display device 170. The part of the virtual world seen by the wearer via the one or more screens is referred to as a seen space of the virtual world corresponding to the wearable electronic device 10. The size of the seen space is determined by a field of view corresponding to the wearer in the virtual world, wherein the field of view may be predetermined by the specification of the virtual world or the screens according to the actual needs. The screens, for example, may be an organic light-emitting diode (OLED) display panel, active matrix organic light-emitting diode (AMOLED) display panel, Field Sequential liquid crystal display (FS-LCD) panel, thin-film transistor liquid crystal display (TFT-LCD) panel, or other suitable display panel.

In an embodiment, assuming that the wearable electronic device 10' is a AR/MR HMD device (as illustrated in FIG. 1B), the display device 170 may include one or more transparent lenses disposed on the front surface of the wearable electronic device 10'. In this embodiment, the wearer's sight may pass through the transparent lenses and see a scene of the real world through the lenses. That scene may be referred to as the seen space corresponding to the wearable electronic device 10'. In other words, a real-world scene through the lenses and the rendered visual content together may be captured by the wearer's visual perception as the seen space viewed by the wearer. The size of the seen space is determined by a field of view of the lens, wherein the field of view of the lens may be predetermined by the specification of the lens according to the actual needs. The display device 170 is configured to render a visual content (e.g., a virtual object) on a display surface of the transparent lenses in a manner of directly transmitting image signals of the visual content to the lenses to make the lenses itself to display the visual content according to the image signals. The lenses, for example, may be a transparent organic light-emitting diode (OLED) display panel, active matrix organic light-emitting diode (AMOLED) display panel, Field Sequential liquid crystal display (FS-LCD) panel, or thin-film transistor liquid crystal display (TFT-LCD) panel, or other suitable transparent display panel. In another embodiment, the display device 170 is configured to render the visual content on the lenses in a manner of projecting an image of the visual content onto the display surface of the lenses which may contain a transparent reflect layer which would reflect the projected image of the visual content.

Figure 4:
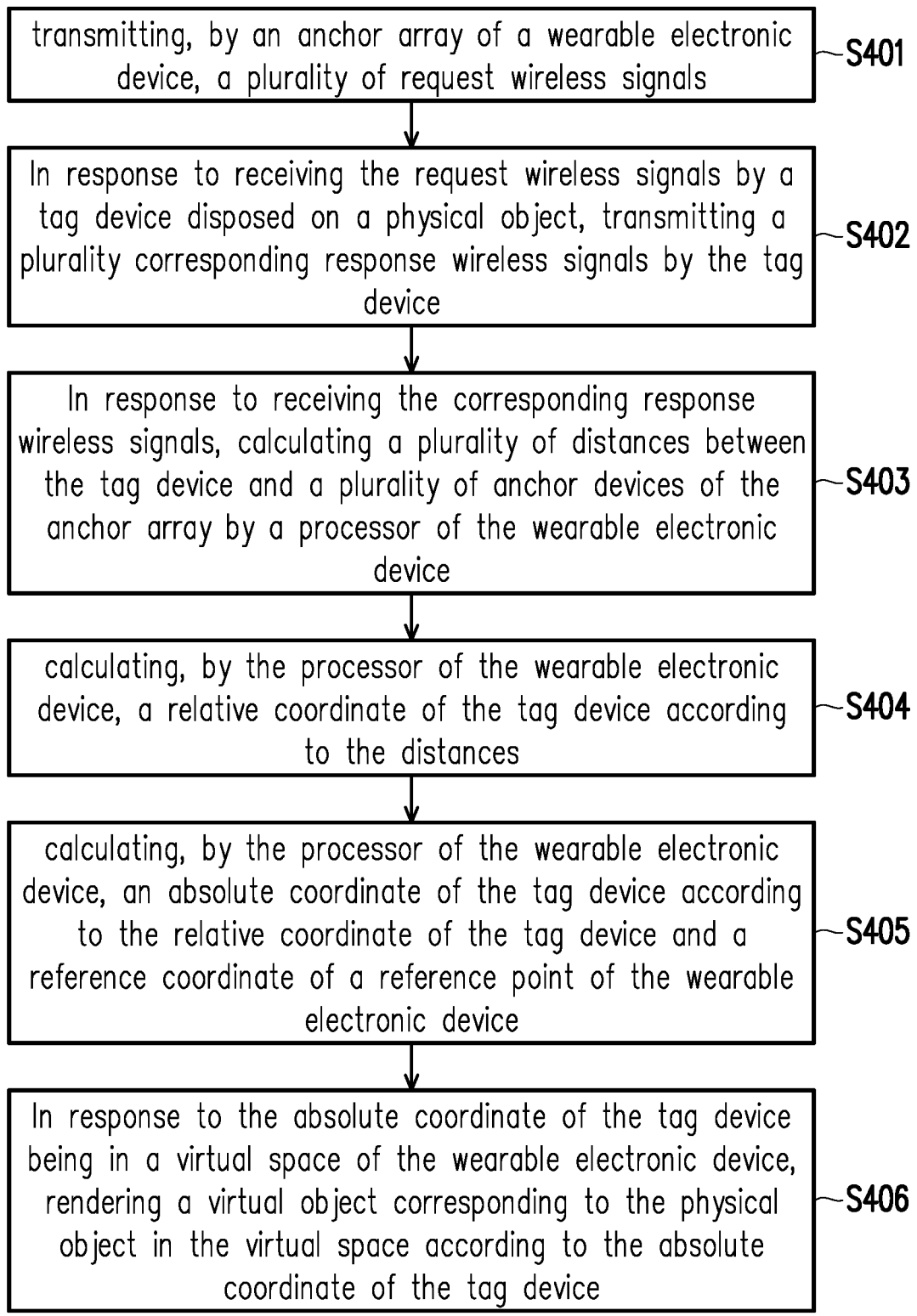
FIG. 4 shows a flow chart of a computer-implement operating method according to the first embodiment of the present invention.

Referring to FIG. 4, in step S401, the anchor array 11 of a wearable electronic device 10 transmits a plurality of request wireless signals SGL1 to a tag device 21(1) disposed on a physical object 20. For example, referring to FIG. 2B, the anchor devices 11(1) to 11(3) sequentially transmit request wireless signals SGL1(1) to SGL(3) to the tag device 21(1). In another embodiment, the anchor devices 11(1) to 11(3) of the anchor arrays 11 transmit the request wireless signals at the same time, and each of the request wireless signals further includes an anchor device identification (ID) of corresponding each of the anchor devices (e.g., the request wireless signals SGL1(1) further includes the anchor ID of the anchor devices 11(1)).

Furthermore, in the embodiment, the generated one of response wireless signals corresponding to one of the request wireless signals further includes the anchor device ID of that said one of the request wireless signals (e.g., the generated response wireless signal SGL2(1) further includes the anchor ID of the anchor devices 11(1)). Such that, the processor 110 may identify one request wireless signal and the corresponding response wireless signal via the anchor device ID included therein, and then the processor 110 may calculate the distance between the anchor device corresponding to the anchor device ID and the tag device according to the identified request wireless signal and corresponding response wireless signal.

Next, in step S402, in response to receiving the request wireless signals SGL1 by the tag device 21(1), the tag device 21(1) transmits a plurality corresponding response wireless signals SGL2 to the anchor array 11. For example, referring to FIG. 2B, when the tag device 21(1) receives the request wireless signal SGL1(1), the tag device 21(1) transmits a corresponding response wireless signal SGL2(1) to the anchor array 11.

Next, in step S403, in response to receiving the corresponding response wireless signals by the anchor array 11, the processor 110 calculates a plurality of distances between the tag device and each of a plurality of anchor devices of the anchor array 11 according to the request wireless signals and the response wireless signals. For example, referring to FIG. 2B, when the response wireless signal SGL2(1) is received by the anchor device 11(1) which is the anchor device transmitted the corresponding request wireless signal SGL1(1), the processor 110 may calculate the distance between the tag device 21(1) and the anchor device 11(1) according to the request wireless signal SGL1(1) and the response wireless signal SGL2(1). In other words, the processor 110 uses the two corresponding wireless devices (e.g., the request wireless signal SGL1(1) and the response wireless signal SGL2(1) respectively transmitted by the tag device 21(1) and one of the anchor devices 11(1) to 11(3)) to calculate the distance between the tag device 21(1) and that said one of the anchor devices 11(1) to 11(3).

The corresponding two wireless signals respectively transmitted by a pair of the tag device and corresponding anchor device may be referred to as "request-response wireless signal pair", the pair of the tag device and corresponding anchor device transmitting that "request-response wireless signal pair" may be referred to as "anchor-tag device pair", and every request-response wireless signal pair is used for calculating the distance between the corresponding "anchor-tag device pair". For example, the wireless signals SGL1(1) and SGL2(1) are "request-response wireless signal pair" corresponding to the anchor-tag device pair 11(1) and 21(1). Referring back to FIG. 2B, the distance between the anchor-tag device pair 11(1) and 21(1) is calculated according to the request-response wireless signal pair SGL1(1) and SGL2(1); the distance between the anchor-tag device pair 11(2) and 21(1) is calculated according to the request-response wireless signal pair SGL1(2) and SGL2(2); the distance between the anchor-tag device pair 11(3) and 21(1) is calculated according to the request-response wireless signal pair SGL1(3) and SGL2(3).

It should be noted that, in another embodiment, that said one of the anchor devices itself may calculate that distance itself rather than the processor 110.

The calculations of the distances between every anchor-tag device pair may be implement by one or more algorithms/methods (e.g., a Beamforming, Time of Light (TOF), Time Difference of Arrival (TDOA), Frequency Difference of Arrival (FDOA), or other similar associated techniques and algorithms/methods thereof).

For convenience of explanation, the calculations of the distances between every anchor-tag device pair in the presented embodiments are implemented by TOF algorithm by the processor 110. For example, assuming that the anchor device 11(1) generate a request wireless signal SGL1(1) including a transmitting time, wherein the transmitting time of the request wireless signal SGL1(1) is a current time when the anchor device 11(1) transmits request wireless signal SGL1(1) (e.g., the current time may be identified by the clock/timer 1113). The generated request wireless signal SGL1(1) is transmitted by the anchor device 11(1). Then, in response to receiving request wireless signal SGL1(1) by the tag device 21(1), the tag device 21(1) identifies a current time of the tag device 21(1) as a receiving time (e.g., by the clock/timer 2113), generates a response wireless signal SGL2(1) including the receiving time, and then transmits the generated response wireless signal SGL2(1) which is corresponding to request wireless signal SGL1(1) to the anchor array 11. Then, in response to receiving the response wireless signal SGL2(1) by the anchor device 11(1) (i.e., the anchor device which transmitted the request wireless signal SGL1(1)), the processor 110 calculates a time difference between the receiving time of the response wireless signal SGL2(1) and the transmitting time of the request wireless signal SGL1(1). Then, the processor 110 calculates the distance between the tag device 21(1) and the anchor device 11(1) according to the time difference.

For example, assuming that the calculated time difference is $3.33*10^{-9}$ seconds, the processor may multiple the time difference with the speed of the (request) wireless signal SGL1(1) (e.g., the speed of light, 299,792,458 m/s), so as to obtain the product value 0.99830888514 (m) as the distance between the tag device 21(1) and the anchor device 11(1).

After the distances between the tag device 21(1) and each of the plurality of anchor devices of the anchor array 11 are calculated, in step S404, the processor may calculate a relative coordinate of the tag device according to the distances. Specifically, the processor 110 may calculate the spatial information of the tag device 21(1) according to the calculated distances and the known disposing position of all the anchor device by using one or more algorithms/methods (e.g., Triangulation method, Multilateration method, Angle of Arrival (AoA), Time Difference of Arrival (TDOA), or other similar associated techniques and algorithms/methods thereof). The spatial information may be a direction vector in the orthogonal coordinate system (a 3D direction vector). For convenience of explanation, in the present embodiments, the method for calculating the relative coordinate of the tag device is the Triangulation method.

Figure 5A:
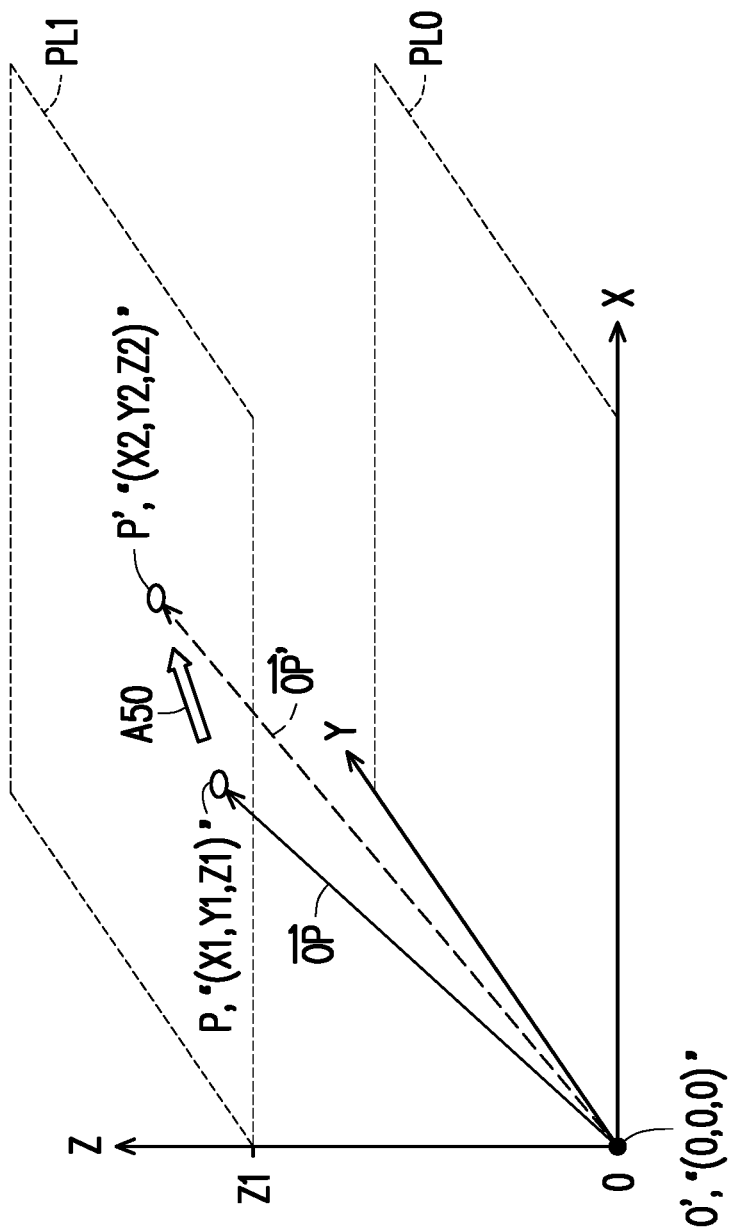
FIG. 5A shows schematic diagram of positioning the relative coordinate of a tag device according to the first embodiment of the present invention.

Referring to FIG. 5A, for example, the assuming that the reference point O is the original point in the orthogonal coordinate system X-Y-Z, the reference point O is on the plane PL0, and point P in on the plane PL1. In the first embodiment, the position of the reference anchor device (e.g., anchor device 11(1)) in the orthogonal coordinate system X-Y-Z is presented by reference point O, and the position of the tag device 21(1) is presented by point P. After three distances between the tag device 21(1) and each of the plurality of anchor devices 11(1) to 11(3) are calculated at a timepoint, the corresponding spatial information (e.g., the direction vector $\overline{OP}$) of the tag device 21(1) may be calculated. Then, the coordinate "(X1, Y1, Z1)" of the tag device 21(1) relative to the reference point O is obtained/calculated according to the direction vector $\overline{OP}$, and the coordinate "(X1, Y1, Z1)" of the tag device 21(1) may be referred to as relative coordinate of the tag device 21(1). In other words, the relative coordinate of the tag device 21(1) is the coordinate of the tag device 21(1) relative to the reference anchor device 11(1).

In the first embodiment, all the anchor devices of the anchor array 11 may continuously transmit the request wireless signals SGL1 and receives the corresponding response wireless signal SGL2, so as to continuously identifies the relative coordinate of the tag device 21(1). Therefore, the processor 110 may always aware the position of the tag device 21(1) and the physical object 20. For example, at another timepoint as illustrated by arrow A50 in FIG. 5A, the tag device 21(1) is moved to point P', the current direction vector $\overline{OP}'$ of point P' is calculated, and the relative coordinate of the point P' is obtained. It should be noted that the foregoing method for calculating the distances and the relative coordinate of the tag device 21(1) is exemplary, and the present invention is not limited thereto.

Referring back to FIG. 4, after the relative coordinate of the tag device 21(1) is calculated, in step S405, the processor 110 calculates an absolute coordinate of the tag device according to the relative coordinate of the tag device and a reference coordinate of a reference point of the wearable electronic device. Specifically, the reference point may represent the position of a reference anchor device of the anchor array in an orthogonal coordinate system (also referred to as the absolute coordinate system) of the virtual space, and the coordinate (also referred to as the reference coordinate) of the reference point is referred to as an absolute coordinate of the reference point in the virtual space corresponding to the wearable electronic device 10.

Figure 5B:
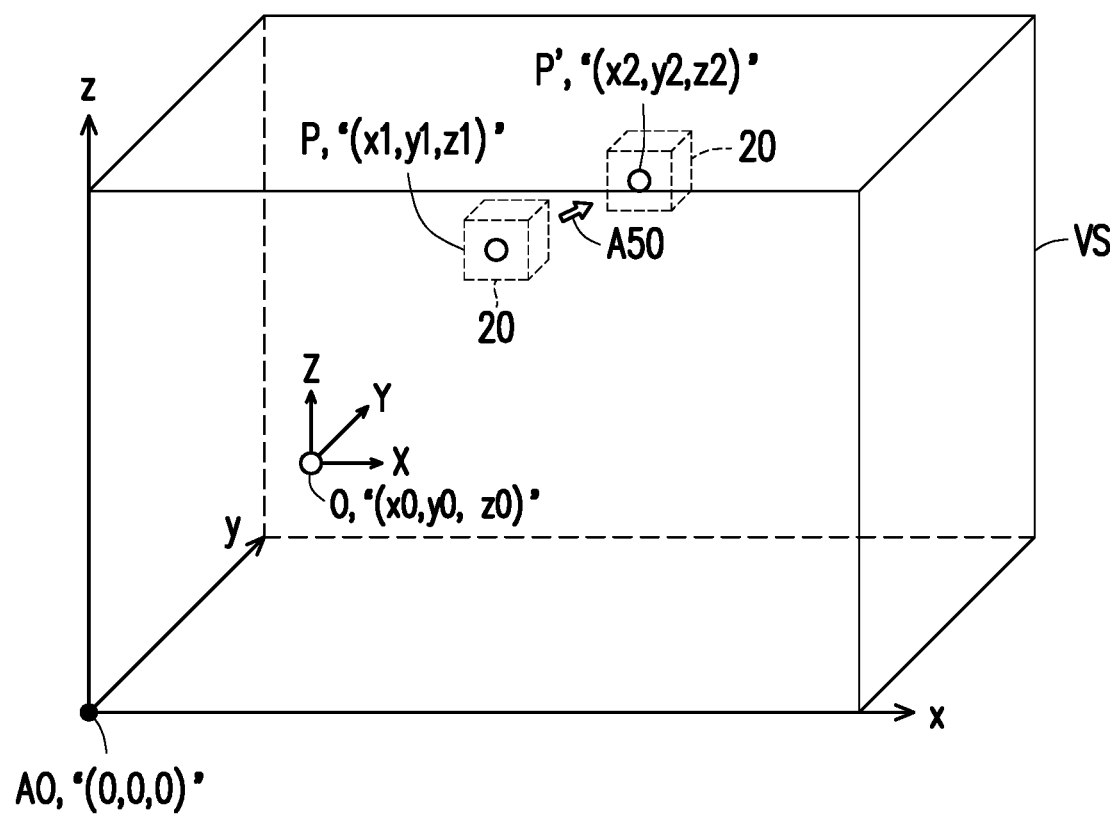
FIG. 5B shows schematic diagram of positioning the absolute coordinate of the tag device in FIG. 5A according to the first embodiment of the present invention.

Referring to FIG. 5B, for example, assuming that the reference point O has the reference coordinate "(x0, y0, z0)" in the absolute coordinate system x-y-z, the origin point AO of the absolute coordinate system x-y-z may be predetermined according to the design of the virtual space VS corresponding to the wearable electronic device 10. In this example, the processor 110 may perform a coordinate transformation on the relative coordinate "(X1, Y1, Z1)" of the point P and the relative coordinate "(X2, Y2, Z2)" point P' according to the reference coordinate "(x0, y0, z0)", so as to obtain the absolute coordinate "(x1, y1, z1)" of the point P and the absolute coordinate "(x2, y2, z2)" of the point P' in the absolute coordinate system x-y-z of the virtual space VS. Furthermore, the position and the movement of the tag device 21(1) and the physical object 20 at different timepoint would be determined according to the obtained absolute coordinates of the point P and point P'.

Referring back to FIG. 4, in step S406, in response to the absolute coordinate of the tag device 21(1) is identified as being in a seen space of a virtual space by the processor 110, the processor 110 may instruct the display device 170 to render a virtual object corresponding to the physical object 20 into the seen space according to the absolute coordinate of the tag device 21(1). Specifically, the seen space may include a plurality of 3D absolute coordinates (also referred to as the seen absolute coordinates) of the absolute coordinate system of the virtual space. For example, when the wearer moves his/her head, the seen space of the virtual space varies correspondingly, and the change of the seen absolute coordinates of the varied seen space is identified in real-time by the processor 110. In the first embodiment, the processor 110 is configured to determine whether the absolute coordinate of the tag device 21(1) is in the seen space of the virtual space by comparing/matching the absolute coordinate of the tag device 21(1) with the plurality of seen absolute coordinates. In response to determining that the absolute coordinate of the tag device 21(1) is equal to one of the seen absolute coordinates, the absolute coordinate of the tag device 21(1) is identified as being in the seen space, and the processor 110 may determine that the position of the virtual object corresponding to the physical object 20 in the seen space is that matched absolute coordinate of the tag device 21(1). Then, the processor 110 may instruct the display device 170 to render the virtual object into the seen space of the virtual space at that matched absolute coordinate of the tag device 21(1).

It should be mentioned that the operating method and related operations performed by the tracking system 1 explained by the foregoing first embodiment use only one tag device 21(1) disposed in the physical object 20. However, the present invention is not limited thereto. In other embodiment, the number of the disposed tag devices may equal to or larger than two.

Second Embodiment

Most of the hardware elements (and the functions thereof) of the wearable electronic device 10 in the second embodiment are as the same as the first embodiment, the corresponding descriptions would be omitted, and the differences between the second embodiment and the first embodiment would be explained below.

Figure 6:
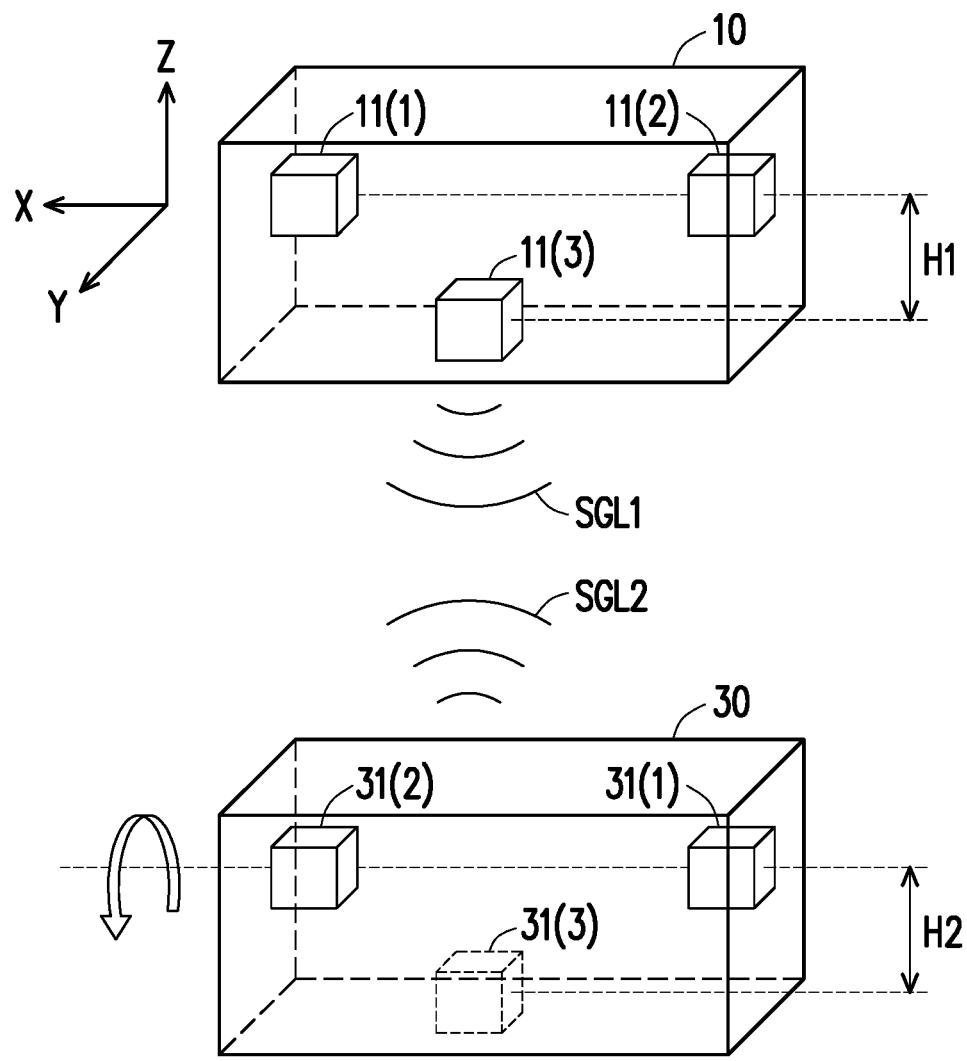
FIG. 6 shows a schematic diagram of a tracking system according to a second embodiment of the present invention.

Referring to FIG. 6, in the second embodiment, the tracking system 2 includes a wearable electronic device 10 and a plurality of tag devices 31(1) and 31(2) disposed in a physical object 30. Specifically, the amount of the tag devices may be larger than or equal to two (FIG. 6 uses two tag devices for the convenience of explanation). In a further embodiment, an additional tag device 31(3) may be disposed at a plane having a distance H2 to the plane of which the tag devices 31(1) and 31(2) disposed, and the tag device 31(3) may be used for detecting the rotation of the physical object 30 (e.g., the tag devices 31(1) and 31(2) may be disposed on the central line of the physical object 30).

Figure 7A:
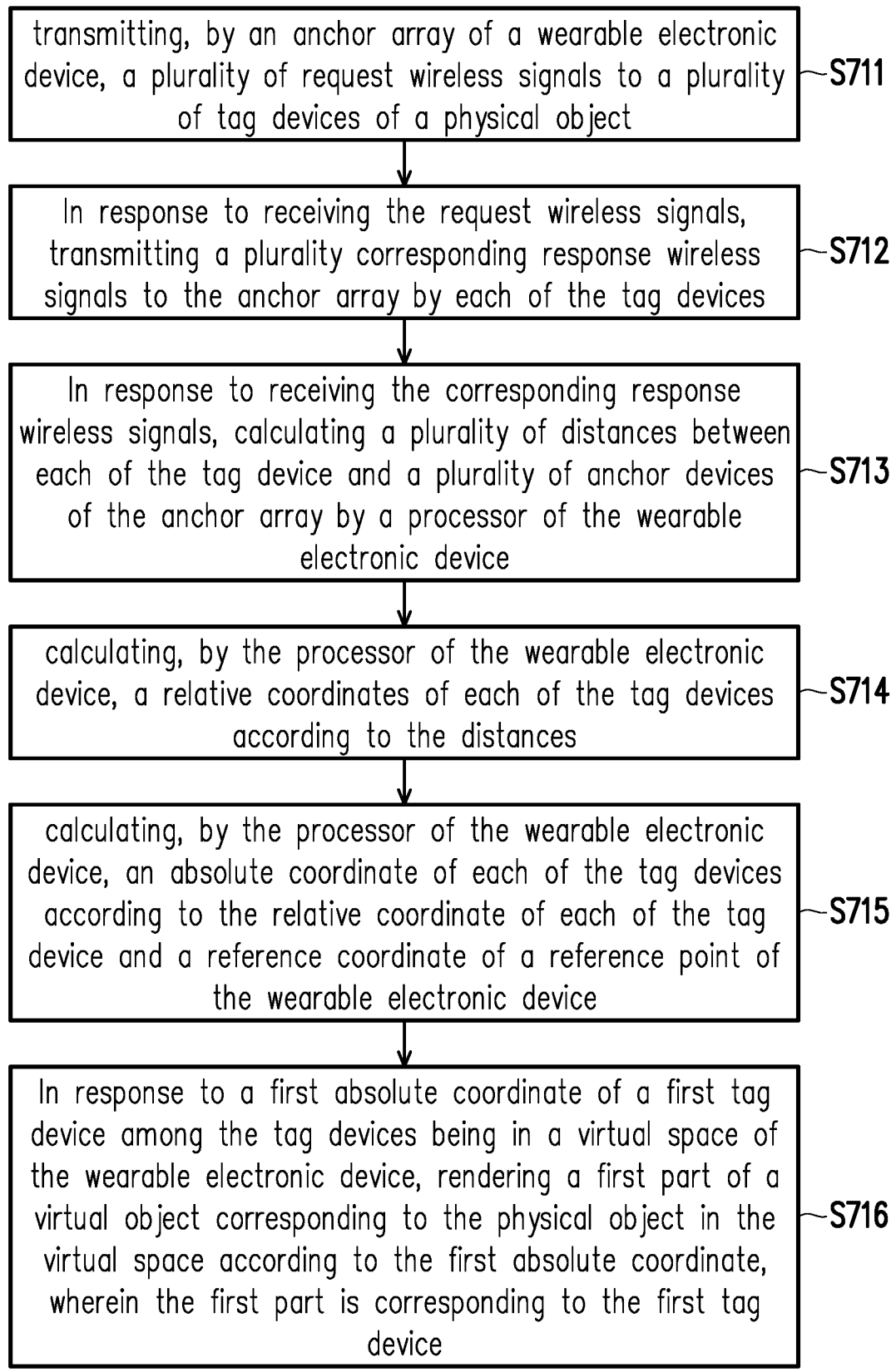
FIG. 7A shows a flow chart of a computer-implement operating method according to the second embodiment of the present invention.

Referring to FIG. 7A, in step S711, the anchor array 11 is configured to transmit a plurality of request wireless signals SGL1 to a plurality of tag device 31(1) and tag devices 31(2) disposed on a physical object 30. For example, the request wireless signal transmitted by the anchor device 11(1) would be received by the tag device 31(1) and tag devices 31(2); the request wireless signal transmitted by the anchor device 11(2) would be received by the tag device 31(1) and tag devices 31(2); the request wireless signal transmitted by the anchor device 11(3) would be received by the tag device 31(1) and tag devices 31(2).

Next, in step S712, in response to receiving the request wireless signals SGL1 by the tag devices 31(1) and 31(2), each of the tag devices 31(1) and 31(2) transmits a plurality corresponding response wireless signals SGL2 to the anchor array 11. For example, a corresponding response wireless signal would be transmit by the tag device 31(1) when the tag device 31(1) receives the request wireless signal transmitted by the anchor device 11(1), a further corresponding response wireless signal would be transmit by the tag device 31(1) when the tag device 31(1) receives the request wireless signal transmitted by the anchor device 11(2), and a further corresponding response wireless signal would be transmit by the tag device 31(1) when the tag device 31(1) receives the request wireless signal transmitted by the anchor device 11(3).

Next, in step S713, in response to receiving the corresponding response wireless signals by the anchor array 11, the processor 110 calculate a plurality of distances between each of the tag devices and each of a plurality of anchor devices of the anchor array 11 according to the request wireless signals and the response wireless signals. Specifically, the distances between one (e.g., tag device 31(1)) of the tag devices and each of the anchor devices 11(1) to 11(3) are calculated in the manner of the method provided in the first embodiment (e.g., step S403), and the corresponding detail is omitted hereto.

Next, in step S714, the processor 110 may calculate a relative coordinate of each of the tag devices according to the distances. Specifically, the method of calculating the relative coordinate of one of the tag devices is the same as the method provided in the first embodiment (e.g., step S404), and the corresponding detail is omitted hereto.

Next, in step S715, the processor 110 calculates an absolute coordinate of each of the tag devices according to the relative coordinate of each of the tag device and a reference coordinate of a reference point of the wearable electronic device. Specifically, the method of calculating the absolute coordinate of one of the tag devices is the same as the method provided in the first embodiment (e.g., step S405), and the corresponding detail is omitted hereto.

Next, in step S716, in response to a first absolute coordinate of a first tag device among the tag devices is identified as being in a seen space of a virtual space by the processor 110, the processor 110 instructs the display device 170 to render a first part of a virtual object corresponding to the physical object into the seen space according to the first absolute coordinate by a display device of the wearable electronic device.

Specifically, the concept of the seen space is explained in the description of the step S406 of the operating method in the first embodiment. In the second embodiment, the tag devices respectively correspond a plurality of parts (also referred to the physical parts) of the physical object, and those parts may be predetermined according to the disposing positions of the tag devices in the physical object. Furthermore, the virtual object corresponding to the physical object is divided into a plurality of parts (also referred to the virtual parts), and the virtual parts are corresponding to the physical parts in which the tag devices disposed.

Figure 11A:
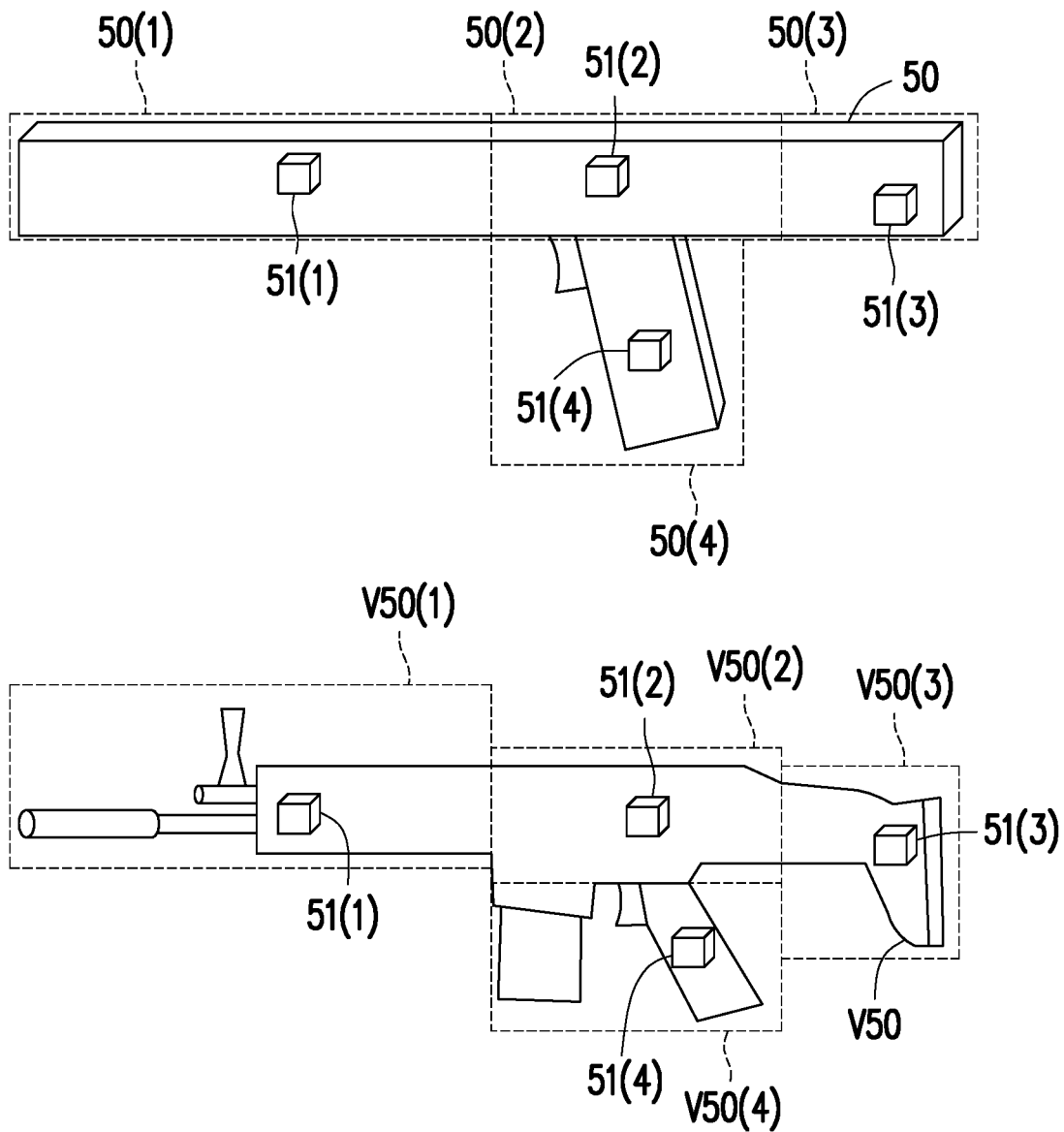
FIG. 11A shows a schematic diagram of a physical object, corresponding virtual object and corresponding tag devices according to the third embodiment of the present invention.

Referring to FIG. 11A, for example, the physical object 50 may be divided into four physical parts 50(1) to 50(4) according to the disposed tag devices 51(1) to 51(4), and the virtual object 50 corresponding to the physical object 50 may be divided into four corresponding virtual parts V50(1) to V50(4), wherein the virtual parts V50(1) to V50(4) are corresponding to the physical parts 50(1) to 50(4) and the tag devices 51(1) to 51(4).

Figure 11B:
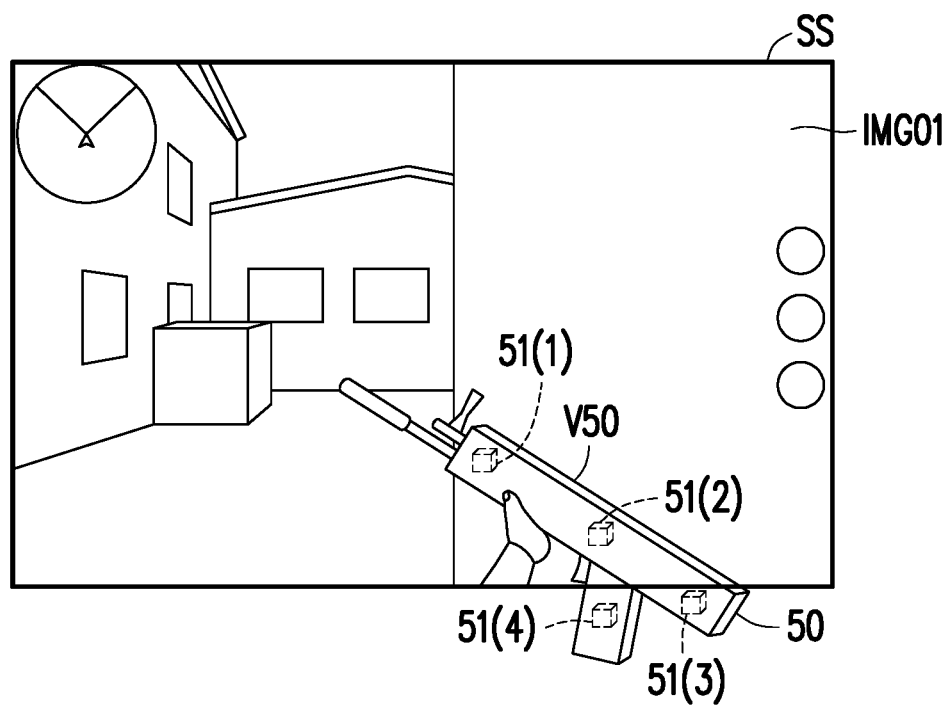
FIG. 11B shows a schematic diagram of rendering parts of the virtual object corresponding the parts of the physical object entering a seen space of the virtual space according to a third embodiment of the present invention.

Referring to FIG. 11B, for example, assuming that the wearer of the wearable electronic device 10 sees the image of the seen space SS (as illustrated by image IMG01), and the absolute coordinates of the tag devices 51(1) and 51(2) are identified as being in the seen space SS. The processor 110 may instruct the display device 170 to render the virtual parts V50(1) and V50(2) of the virtual object V50 corresponding to the physical object 50 into the seen space SS. Furthermore, it should be noted that the absolute coordinates of the tag devices 51(3) and 51(4) is identified as not being in the seen space, and thus, the corresponding virtual parts V50(3) and V50(4) would not be rendered into the seen space SS, and the physical parts 50(3) and 50(4) would not be seen in the seen space SS by the wearer.

Moreover, the size of the rendered virtual parts of the virtual object V50 in the seen space is determined according to a reference distance between the absolute coordinates of the tag devices and the reference coordinate of the reference point. In other words, the processor may scale the sizes of the rendered virtual parts according to the distances between the tag devices and the wearable electronic device 10.

In the second embodiment, since the plurality of the tag devices are disposed into the physical object 30, the real-time change of motion and attitude of the physical object 30 may be identified according to the calculated relative coordinates (or absolute coordinates) of the tag devices 31(1) and 31(2) at different timepoints by the processor 110.

Figure 7B:
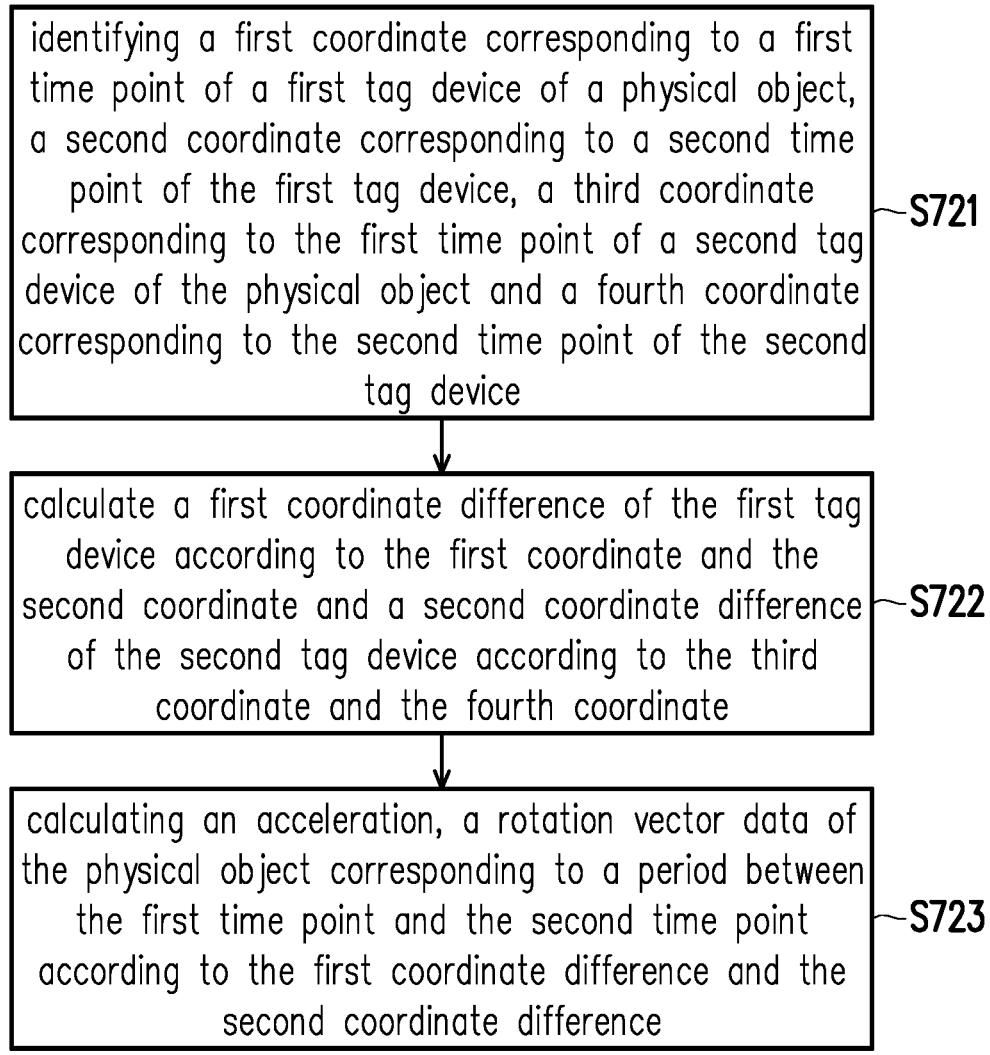
FIG. 7B shows a flow chart of calculating motion data according to the second embodiment of the present invention.

Referring to FIG. 7B, in step S721, the processor 110 is configured to identify a first coordinate corresponding to a first timepoint of a first tag device 31(1), a second coordinate corresponding to a second timepoint of the first tag device 31(1), a third coordinate corresponding to a third timepoint of a second tag device 31(2) and a fourth coordinate corresponding to a fourth timepoint of the second tag device 31(2). The first to fourth coordinates has been calculated and stored in the memory 120 before executing step S721. In this embodiment, the second timepoint is later than the first timepoint, and the fourth timepoint is later than the third timepoint. The third timepoint may equal to or much slightly later than the first timepoint (but he third timepoint is earlier than the second timepoint), and the fourth timepoint may equal to or much slightly later than the second timepoint. However, for convenience of explanation, the first timepoint is set to be equal to the third timepoint, and the fourth timepoint is set to be equal to the second timepoint.

Next, in step S722, the processor 110 calculates a first coordinate difference of the first tag device 31(1) according to the first coordinate and the second coordinate and a second coordinate difference of the second tag device 31(2) according to the third coordinate and the fourth coordinate.

Next, in step S723, the processor 110 calculates motion data of the physical object 30 according to the first coordinate difference and the second coordinate difference, wherein the calculated motion data corresponding to a time period constituted by the first timepoint to the fourth timepoint. In other words, the processor 110 may calculate the change of the motion and the attitude of the physical object 30 during the time period according to the change of the positions of the tag devices 31(1) and 31(2). In an embodiment, if the tag devices 31(1) and 31(2) are part of all the tag devices of the physical object and the tag devices 31(1) and 31(2) are disposed into a specific part of the physical object, the processor 110 calculates motion data of that specific part of the physical object 30 corresponding to tag devices 31(1) and 31(2) according to the first coordinate difference and the second coordinate difference.

Figure 8A:
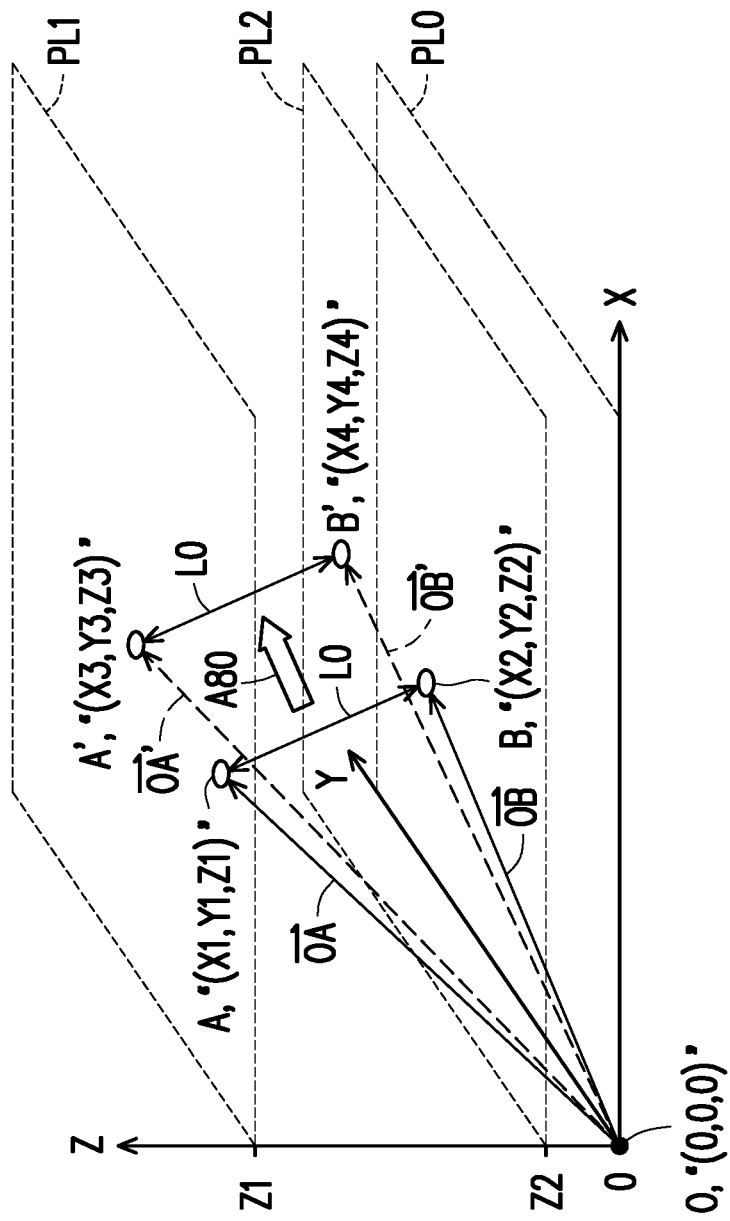
FIG. 8A shows schematic diagram of obtaining one of motion data of the tag devices according to the second embodiment of the present invention.

Referring to FIG. 8A, assuming that the point O (on the plane PL0) represents the position of the reference anchor device 11(1), the point A (on the plane PL1) represents the position of the first tag device 31(1) at the first timepoint, the point B (on the plane PL2) represents the position of the second tag device 31(2) at the first timepoint, the point A' represents the position of the first tag device 31(1) at the second timepoint, the point B' represents the position of the second tag device 31(2) at the second timepoint, and the distance L0 between tag device 31(1) and tag device 31(2) is fixed.

In this example, the direction vectors $\overline{OA}$ of the point A, the direction vectors $\overline{OB}$ of the point B, the direction vectors $\overline{OA}$' of the point A', the direction vectors $\overline{OB}$' of the point B', the corresponding relative coordinates of point A, A', B and B' are calculated in the manner the same as the first embodiment, the detail is omitted hereto.

The processor 110 may calculate the first coordinate difference according to the relative coordinate "X1, Y1, Z1" of tag device 31(1) at the first timepoint and the relative coordinate "X3, Y3, Z3" of tag device 31(1) at the second timepoint, and calculated the second coordinate difference according to the relative coordinate "X2, Y2, Z2" of tag device 31(2) at the first timepoint and the relative coordinate "X4, Y4, Z4" of tag device 31(2) at the second timepoint. Then, the processor 110 may calculate related motion data according to the first coordinate difference and the second coordinate difference during the time period from the first timepoint to the second timepoint, and the processor 110 may aware that the motion or the change of the attitude of the physical object 30 (or the tag devices therein) is in a manner of shift along a direction as illustrated by arrow A80.

In the second embodiment, the calculated motion data includes but not limited at least one of the following: (1) an acceleration of the first tag device, the second tag device and the physical object; (2) an angular acceleration value of the first tag device, the second tag device and the physical object; (3) a velocity value of the first tag device, the second tag device and the physical object; (4) an angular velocity value of the first tag device, the second tag device and the physical object; and (5) a rotation vector of the first tag device, the second tag device and the physical object.

Figure 8B:
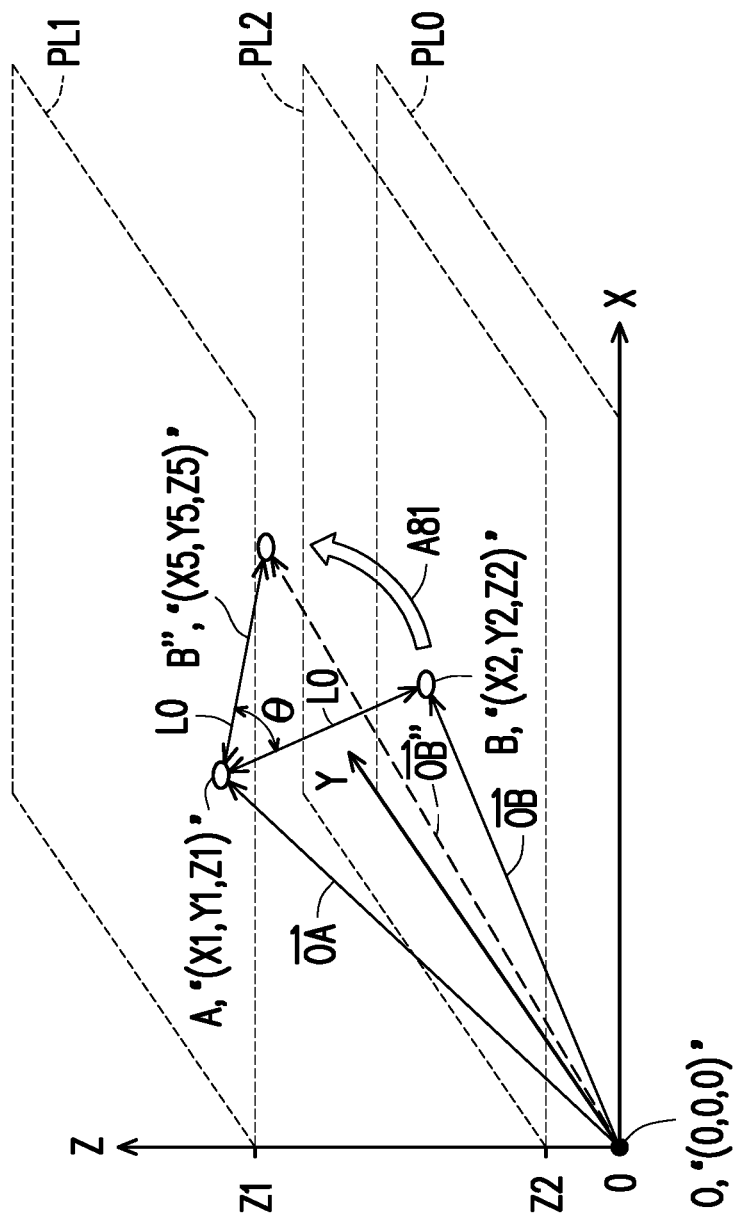
FIG. 8B shows schematic diagram of obtaining one of motion data of the tag devices according to the second embodiment of the present invention.

Referring to FIG. 8B, for example, similar to FIG. 8A, assuming that the point O (on the plane PL0) represents the position of the reference anchor device 11(1), the point A (on the plane PL1) represents the position of the first tag device 31(1) at the first timepoint and the second timepoint (e.g., the position of the tag device 31(1) is fixed from the first timepoint to the second timepoint), the point B (on the plane PL2) represents the position of the second tag device 31(2) at the first timepoint, the point B" represents the position of the second tag device 31(2) at the second timepoint, and the distance L0 between tag device 31(1) and tag device 31(2) is fixed.

The processor 110 may calculate the first coordinate difference (i.e., zero) according to the relative coordinate "X1, Y1, Z1" of tag device 31(1) at the first timepoint and the relative coordinate "X1, Y1, Z1" of tag device 31(1) at the second timepoint, and calculated the second coordinate difference according to the relative coordinate "X2, Y2, Z2" of tag device 31(2) at the first timepoint and the relative coordinate "X5, Y5, Z5" of tag device 31(2) at the second timepoint. Then, the processor 110 may calculate related angle θ and corresponding angular accelertation/velocity according to the first coordinate difference and the second coordinate difference during the time period from the first timepoint to the second timepoint, and the processor 110 may aware that the motion or the change of the attitude of the physical object 30 (or the tag devices therein) is in a manner of swinging as illustrated by arrow A81. Then, after the motion or the change of the attitude of the physical object 30 is determined, the processor 110 may instruct the display device 170 to render in real-time the virtual object (and the movement thereof) corresponding to the physical object into the virtual space according to the determined motion.

Figure 8C:
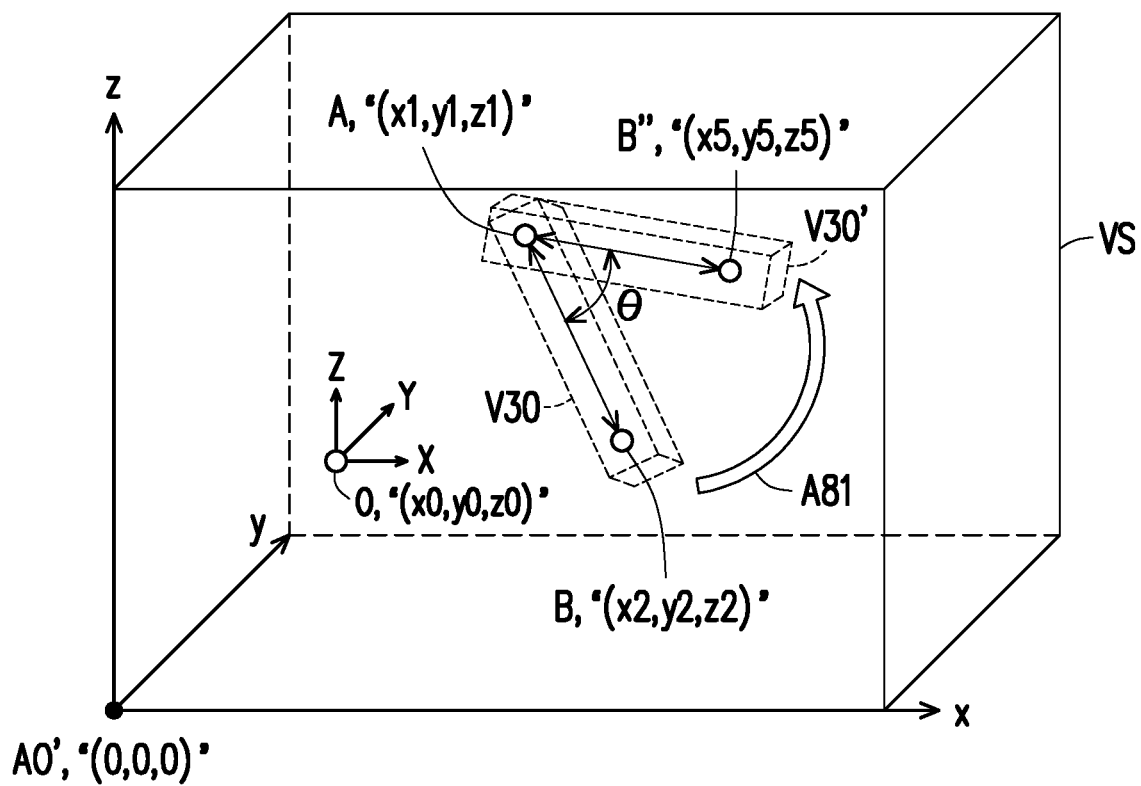
FIG. 8C shows schematic diagram of identifying the change of the physical object corresponding to obtained motion data of the tag devices in FIG. 8B according to the second embodiment of the present invention.

Referring to FIG. 8C, continuing to the example in FIG. 8B, the virtual object V30 corresponding to the physical object 30 at the first timepoint is rendered, and then the virtual object V30' at the second timepoint is rendered (the virtual object V30 at the first timepoint would be removed), such that the movement of the virtual object corresponding to the physical object 30 from the first timepoint to the second timepoint would be displayed in the virtual space VS as illustrated by arrow A81.

It should be mentioned that, through the plurality of tag devices disposed in the physical object and corresponding operating methods provided in the second embodiment, the processor 110 of the wearable electronic device may obtain the motion data of the physical object without disposing and using other motion sensors/detectors (e.g., accelerometer, G-sensor, gyroscope, etc.) in the physical object, such that the cost for those motion sensors/detectors can be saved.

Third Embodiment

Most of the hardware elements (and the functions thereof) of the wearable electronic device 10 in the third embodiment are as the same as the first embodiment, the corresponding descriptions would be omitted, and the differences between the second embodiment and the first embodiment would be explained below.

Figure 9:
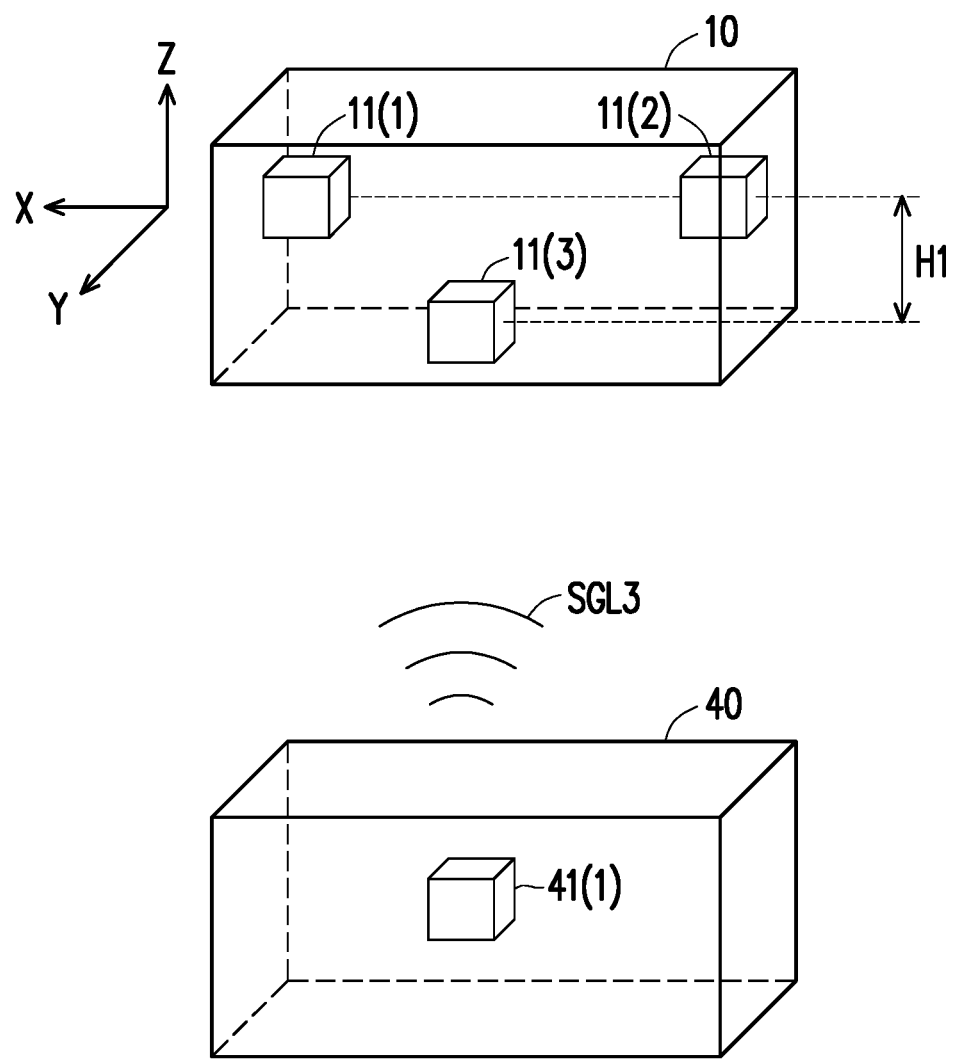
FIG. 9 shows a schematic diagram of a tracking system according to a third embodiment of the present invention.

Referring to FIG. 9, in the third embodiment, the tracking system 3 includes a wearable electronic device 10 and a tag device 41(1) (or multiple tag device as illustrated in the second embodiment) disposed in a physical object 40. In the third embodiment, different to the first embodiment, the anchor array 11 does not transmit the wireless signals to the tag device 41(1), but the tag device 41(1) transmits/broadcasts the wireless signal SGL3 continuously.

Figure 10:
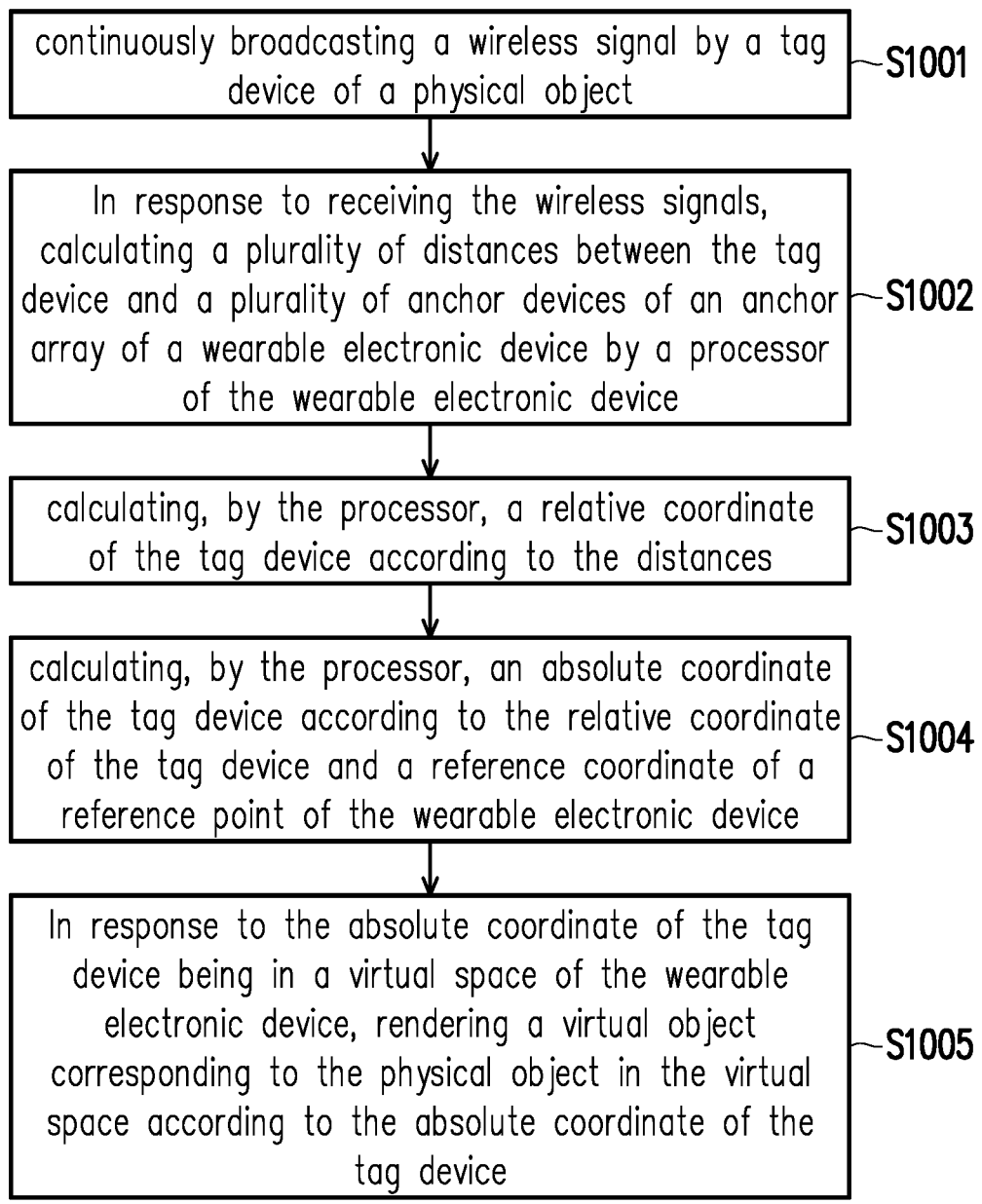
FIG. 10 shows a flow chart of a computer-implement operating method according to the third embodiment of the present invention.

Referring to FIG. 10, in step S1001, the tag device 41(1) broadcast a wireless signal. Specifically, the tag device 41(1) may continuously broadcast a wireless signal SGL3 without receiving a request wireless signal(s) transmitted from the anchor array 11 or other command sent by another electronic device. Every transmitted wireless signal SGL3 includes a transmitting time, wherein the transmitting time of the wireless signal transmitted by the tag device 41(1) is a current time or a timestamp when the tag device transmits the wireless signal, the current time may be indicated by the clock of the tag device 41(1), and the timestamp may be counted by the timer of the tag device 41(1). When the wearable electronic device 10 enters a range of the broadcasting of the wireless signal SGL3, the anchor array may receive the wireless signal SGL3.

Next, in step S1002, in response to receiving the wireless signal SGL3 by the anchor devices 11(1) to 11(3) of the anchor array 11 of the wearable electronic device 10, the processor 110 may calculate a plurality of distances between the tag device 41(1) and the anchor devices 11(1) to 11(3) of the anchor array 11 according to the wireless signal.

For example, when the anchor device 11(1) receives the wireless signal SGL3, the processor 110 (or the anchor device 11(1)) identifies a current time of the wearable electronic device as a receiving time. Then, the processor 110 calculates a time difference between the transmitting time of the wireless signal SGL3 and the identified receiving time, and the processor 110 calculates the distance between the tag device 41(1) and the anchor device 11(1) according to the time difference. Similarly, the distance between the tag device 41(1) and the anchor device 11(2) would be calculated when the anchor device 11(2) receives the wireless signal SGL3 and the corresponding receiving time is identified; and the distance between the tag device 41(1) and the anchor device 11(3) would be calculated when the anchor device 11(3) receives the wireless signal SGL3 and the corresponding receiving time is identified.

After the distances are calculated, continue to step S1003, the processor 110 calculates a relative coordinate of the tag device 41(1) according to the distances. Specifically, the method of calculating the relative coordinate of the tag device 41(1) is the same as the method provided in the first embodiment (e.g., step S404), and the corresponding detail is omitted hereto.

Next, in step S1004, the processor 110 calculates an absolute coordinate of the tag device according to the relative coordinate of the tag device and a reference coordinate of a reference point of the wearable electronic device. Specifically, the method of calculating the absolute coordinate of the tag device 41(1) is the same as the method provided in the first embodiment (e.g., step S405), and the corresponding detail is omitted hereto.

Next, in step S1005, in response to the absolute coordinate of the tag device 41(1) is identified as being in a seen space of a virtual space by the processor 110, the processor 110 instruct the display device 170 to render a virtual object corresponding to the physical object 40 into the seen space according to the absolute coordinate of the tag device 41(1). Specifically, step S1005 is similar to step S406 provided in the first embodiment, and the corresponding detail is omitted hereto.

It should be mentioned that, in an embodiment, in response to first time receiving the wireless signal SGL3 by the anchor array 11, the processor 110 may establish a wireless connection with the tag device 41(1), and the processor 110 may perform a time synchronization with the tag device 41(1) via the wireless connection, such that the accuracy of the calculated distances between the tag device 41(1) and the anchor devices would be improved.

Based on the foregoing embodiment, the provided tracking system and computer-implement operating method for the same are capable of transmitting the request wireless signals and receiving corresponding response signals transmitted by one or more tag devices disposed in a physical object, analyzing a time difference of those wireless signals to obtain the absolute coordinate of each of the one or more tag devices in the virtual space, and accordingly render a virtual object corresponding to the physical object into the virtual space according to the absolute coordinates of the one or more tag devices, such that the position and the motion of the physical object for controlling the corresponding virtual object can be determined accurately and efficiently without performing a image recognition, or a laser position operation on the physical object. Therefore, the function of the tracking system would be improved and the cost of the tracking system can be decreased.

It will be apparent to those skilled in the art that various modifications and variations can be made to the structure of the present invention without departing from the scope or spirit of the invention. In view of the foregoing, it is intended that the present invention cover modifications and variations of this invention provided they fall within the scope of the following claims and their equivalents.

What is claimed is:

1. A tracking system, comprising:
   a wearable electronic device, wherein the wearable electronic device comprises an anchor array, a processor and a display device; and
   at least one tag device, wherein the at least one tag device is disposed in a physical object,
   wherein the anchor array is configured to transmit a plurality of request wireless signals, wherein each of the request wireless signals includes a transmitting time of that said each of the request wireless signals,
   wherein in response to receiving the request wireless signals by the at least one tag device, the at least one tag device is configured to transmit a plurality of corresponding response wireless signals to the anchor array of the wearable electronic device,
   wherein in response to receiving the corresponding response wireless signals by the anchor array, the processor is configured to calculate a plurality of distances between the at least one tag device and each of a plurality of anchor devices disposed in the anchor array of the wearable electronic device according to the request wireless signals and the corresponding response wireless signals,
   wherein the processor is configured to calculate a relative coordinate of the at least one tag device according to the distances,
   wherein the processor is configured to calculate an absolute coordinate of the at least one tag device according to both the relative coordinate of the at least one tag device and a reference coordinate of a reference point of the wearable electronic device, wherein the reference coordinate is an absolute coordinate of the reference point in a virtual space corresponding to the wearable electronic device, wherein in response to the absolute coordinate of the at least one tag device is identified as being in a seen space of the virtual space by the processor, the processor is configured to instruct the display device to render at least one part of a virtual object corresponding to the physical object into the seen space according to the absolute coordinate of the at least one tag device, wherein the at least one part of the virtual object is corresponding to at least one part of the physical object, and the at least one tag device is disposed in the at least one part of the physical object.

2. The tracking system according to claim 1, wherein the at least one tag device and the anchor devices are implemented by the wireless transceivers capable of transmitting and receiving millimeter-level wireless signals, and a frequency of each of the request wireless signals and each of the response wireless signals is larger than 20 GHz.

3. The tracking system according to claim 1, wherein the transmitting time of one of the request wireless signals transmitted by one of the anchor devices is a current time when that said one of the anchor devices transmits that said one of the request wireless signals.

4. The tracking system according to claim 1, wherein in response to receiving one of the request wireless signals by the at least one tag device, the at least one tag device identifies a current time of the at least one tag device as a receiving time, and generates one of response wireless signals including the receiving time, wherein the at least one tag device transmits the generated one of response wireless signals corresponding to that said one of the request wireless signals to the anchor array.

5. The tracking system according to claim 4, wherein in response to receiving that said one of the response wireless signals by one of the anchor devices transmitting that said one of the request wireless signals, the processor calculates a time difference between the receiving time of that said one of the response wireless signals and the transmitting time of that said one of the request wireless signals, wherein the processor calculates the distance between the at least one tag device and that said one of the anchor devices according to the time difference.

6. The tracking system according to claim 4, wherein the anchor devices of the anchor arrays transmit the request wireless signals at the same time, wherein each of the request wireless signals further includes an anchor device identification of corresponding each of the anchor devices, wherein the generated one of response wireless signals corresponding to that said one of the request wireless signals further includes the anchor device identification of that said one of the request wireless signals.

7. The tracking system according to claim 1, wherein the reference point is a reference anchor device among the anchor devices, and the relative coordinate of the at least one tag device is a coordinate of the at least one tag device relative to the reference anchor device.

8. The tracking system according to claim 1, wherein at least two of the anchor devices are disposed with a Z-direction distance therebetween.

9. The tracking system according to claim 1, in response to the amount of the at least one tag device is larger than or equal to two, the processor identifies a first coordinate corresponding to a first timepoint of a first tag device among the at least one tag device, a second coordinate corresponding to a second timepoint of the first tag device, a third coordinate corresponding to a third timepoint of a second tag device among the at least one tag device and a fourth coordinate corresponding to a fourth timepoint of the second tag device, wherein the processor calculates a first coordinates difference of the first tag device according to the first coordinate and the second coordinate, and calculates a second coordinate difference of the second tag device according to the third coordinate and the fourth coordinate, wherein the processor calculates motion data of the physical object according to the first coordinate difference and the second coordinate difference, wherein the calculated motion data corresponding to a time period constituted by the first time point to the fourth time point.

10. The wearable electronic system according to claim 9, wherein the motion data comprises:

an acceleration of the first tag device, the second tag device and the physical object;

an angular acceleration value of the first tag device, the second tag device and the physical object;

a velocity value of the first tag device, the second tag device and the physical object;

an angular velocity value of the first tag device, the second tag device and the physical object; and a rotation vector of the first tag device, the second tag device and the physical object.

11. A computer-implement operating method, adapted to a tracking system, wherein the tracking system comprises a wearable electronic device and at least one tag device disposed in a physical object, the method comprising:

transmitting, by an anchor array of the wearable electronic device, a plurality of request wireless signals, wherein each of the request wireless signals includes a transmitting time of that said each of the request wireless signals;

in response to receiving the request wireless signals by the at least one tag device, transmitting a plurality corresponding response wireless signals to the anchor array of the wearable electronic device by the at least one tag device;

in response to receiving the corresponding response wireless signals by the anchor array, calculating a plurality of distances between the at least one tag device and each of a plurality of anchor devices disposed in the anchor array of the wearable electronic device according to the request wireless signals and the corresponding response wireless signals by a processor of the wearable electronic device;

calculating, by the processor, a relative coordinate of the at least one tag device according to the distances;

calculating, by the processor, an absolute coordinate of the at least one tag device according to both the relative coordinate of the at least one tag device and a reference coordinate of a reference point of the wearable electronic device, wherein the reference coordinate is an absolute coordinate of the reference point in a virtual space corresponding to the wearable electronic device; and in response to the absolute coordinate of the at least one tag device is identified as being in a seen space of the virtual space by the processor, rendering at least on part of a virtual object corresponding to the physical object into the seen space according to the absolute coordinate of the at least one tag device by a display device of the wearable electronic device, wherein the at least one part of the virtual object is corresponding to at least one part of the physical object, and the at least one tag device is disposed in the at least one part of the physical object.

12. The computer-implement operating method according to claim 11, wherein the at least one tag device and the anchor devices are implemented by the wireless transceivers capable of transmitting and receiving millimeter-level wireless signals, and a frequency of each of the request wireless signals and each of the response wireless signals is larger than 20 GHz.

13. The computer-implement operating method according to claim 11, wherein the transmitting time of one of the request wireless signals transmitted by one of the anchor devices is a current time when that said one of the anchor devices transmits that said one of the request wireless signals.

14. The computer-implement operating method according to claim 11, wherein the step of transmitting the plurality corresponding response wireless signals to the anchor array of the wearable electronic device by the at least one tag device comprises:

in response to receiving one of the request wireless signals by the at least one tag device, identifying, by the at least one tag device, a current time of the at least one tag device as a receiving time, and generating one of response wireless signals including the receiving time; and transmitting, by the at least one tag device, the generated one of response wireless signals corresponding to that said one of the request wireless signals.

15. The computer-implement operating method according to claim 14, wherein the step of calculating a plurality of distances between the at least one tag device and each of the plurality of anchor devices disposed in the anchor array of the wearable electronic device according to the request wireless signals and the corresponding response wireless signals by a processor of the wearable electronic device comprises:

in response to receiving that said one of the response wireless signals by one of the anchor devices transmitting that said one of the request wireless signals, calculating, by the processor, a time difference between the receiving time of that said one of the response wireless signals and the transmitting time of that said one of the request wireless signals; and calculating, by the processor, the distance between the at least one tag device and that said one of the anchor devices according to the time difference.

16. The computer-implement operating method according to claim 14, wherein the anchor devices of the anchor arrays transmit the request wireless signals at the same time, wherein each of the request wireless signals further includes an anchor device identification of corresponding each of the anchor devices, wherein the generated one of response wireless signals corresponding to that said one of the request wireless signals further includes the anchor device identification of that said one of the request wireless signals.

17. The computer-implement operating method according to claim 11, wherein the reference point is a reference anchor device among the anchor devices, and the relative coordinate of the at least one tag device is a coordinate of the at least one tag device relative to the reference anchor device.

18. The computer-implement operating method according to claim 11, wherein at least two of the anchor devices are disposed with a Z-direction difference therebetween.

19. The computer-implement operating method according to claim 11, in response to the amount of the at least one tag device is larger than or equal to two, the method further comprises:

identifying a first coordinate corresponding to a first timepoint of a first tag device among the at least one tag device, a second coordinate corresponding to a second timepoint of the first tag device, a third coordinate corresponding to a third timepoint of a second tag device among the at least one tag device and a fourth coordinate corresponding to a fourth timepoint of the second tag device;

calculating a first coordinates difference of the first tag device according to the first coordinate and the second coordinate, and calculates a second coordinate difference of the second tag device according to the third coordinate and the fourth coordinate, calculating motion data of the physical object according to the first coordinate difference and the second coordinate difference, wherein the calculated motion data corresponding to a time period constituted by the first time point to the fourth time point.

20. The computer-implement operating method according to claim 19, wherein the motion data comprises:

an acceleration of the first tag device, the second tag device and the physical object;

an angular acceleration value of the first tag device, the second tag device and the physical object;

a velocity value of the first tag device, the second tag device and the physical object;

an angular velocity value of the first tag device, the second tag device and the physical object; and a rotation vector of the first tag device, the second tag device and the physical object.

21. A tracking system, comprising:

a wearable electronic device, wherein the wearable electronic device comprises an anchor array, a processor and a display device; and at least one tag device, wherein the at least one tag device is disposed in a physical object, wherein the at least one tag device is configured to broadcast a wireless signal, wherein the wireless signal includes a transmitting time of the wireless signal, wherein in response to receiving the wireless signal by the anchor array, the processor is configured to calculate a plurality of distances between the at least one tag device and a plurality of anchor devices of the anchor array according to the wireless signal, wherein the processor is configured to calculate a relative coordinate of the at least one tag device according to the distances, wherein the processor is configured to calculate an absolute coordinate of the at least one tag device according to the relative coordinate of the at least one tag device and a reference coordinate of a reference point of the wearable electronic device, wherein in response to the absolute coordinate of the at least one tag device is identified as being in a seen space of a virtual space by the processor, the processor is configured to instruct the display device to render at least one part of a virtual object corresponding to the physical object into the seen space according to the absolute coordinate of the at least one tag device, wherein the at least one part of the virtual object is corresponding to at least one part of the physical object, and the at least one tag device is disposed in the at least one part of the physical object.

22. The tracking system according to claim 21, wherein the transmitting time of the wireless signal transmitted by the at least one tag device is a current time when the at least one tag device transmits the wireless signal.

23. The tracking system according to claim 21, wherein in response to receiving the wireless signal by one of the anchor devices of the anchor array, the processor identifies a current time of the wearable electronic device as a receiving time, the processor calculates a time difference between the transmitting time of the wireless signal and the receiving time, wherein the processor calculates the distance between the at least one tag device and that said one of the anchor devices according to the time difference.

24. The tracking system according to claim 21, wherein in response to first time receiving the wireless signal by the anchor array, the processor establishes a wireless connection with the at least one tag device, wherein the processor performs a time synchronization with the at least one tag device via the wireless connection.

* * * * *